United States Patent [19]
Resnikoff et al.

[11] Patent Number: 5,101,446
[45] Date of Patent: Mar. 31, 1992

[54] METHOD AND APPARATUS FOR CODING AN IMAGE

[75] Inventors: Howard L. Resnikoff, Wincester; David Pollen, Lexington; David C. P. Linden, Cambridge, all of Mass.

[73] Assignee: Aware, Inc., Cambridge, Mass.

[21] Appl. No.: 531,468

[22] Filed: May 31, 1990

[51] Int. Cl.$^5$ .............................................. G06K 9/36
[52] U.S. Cl. ...................................................... 382/56
[58] Field of Search ................................... 382/56, 41

[56] References Cited

U.S. PATENT DOCUMENTS

| | | | |
|---|---|---|---|
| 4,802,110 | 12/1986 | Richards et al. | 382/56 |
| 4,805,129 | 10/1987 | David | 382/56 |
| 4,817,182 | 5/1987 | Adelson et al. | 382/56 |

OTHER PUBLICATIONS

Steven J. Leon, "Linear Algebra with Applications", 1980, pp. 71-74, 85-87.

*Primary Examiner*—Stephen Brinich
*Attorney, Agent, or Firm*—McCubbrey, Bartels, Meyer & Ward

[57] ABSTRACT

A method for coding an image or other two-dimensional data array to provide a sequence of images having differing spatial frequency content is disclosed. The method generates the output images by taking weighted sums of the pixels in the input image. The weights are sets of two-dimensional irreducible scaling and wavelet coefficients.

11 Claims, 12 Drawing Sheets

METHOD AND APPARATUS FOR CODING AN IMAGE

BACKGROUND OF THE INVENTION

The present invention relates to methods and apparatuses for transforming an array of data and, more specifically, to a method and apparatus for reducing the amount of data needed to store an image.

Images are conventionally represented by a two dimensional array of values in which each value represents a property of the image at a corresponding point on the image. In the case of gray-scale images, a single number representing the gradations of intensity from white to black, referred to as the gray scale, is stored. In the case of color images, each "value" is a vector whose components represent the gradations in intensity of the various primary colors, or some alternative color code, at the corresponding point in the image.

This representation of an image corresponds to the output of a typical image-sensing device such as a television camera. Such a representation is convenient in that it is easily regenerated on a display device such as a CRT tube. However, it has at least two short-comings. First, the number of bits needed to represent the data is prohibitively large for many applications. Second, if the image is to be processed to extract features that are arranged in the same order of importance as that perceived by a person viewing the image, the amount of processing needed can be prohibitively large.

The number of bits needed to store a typical image is sufficiently large to limit the use of images in data processing and communication systems. A single 512×512 gray-scale image with 256 gray levels requires in excess of 256,000 bytes. A small-scale computer user is limited to disk storage systems having a capacity of typically 300 Mbytes. Hence, less than 1200 images can be stored without utilizing some form of image compression.

Similarly, the transmission of images over conventional telephone circuitry is limited by the high number of bits needed to represent the image. If an 8×11 inch image were digitized to 256 gray levels at 200 dots per inch (the resolution utilized in typical FAX transmissions) in excess of 28 million bits would be required. Normal consumer-quality analog telephone lines are limited to a digital communication rate of 9600 bits per second. Hence, the transmission of the image would require in excess of 45 minutes in the absence of some form of image compression.

The need to reduce the data required to represent an image has led to numerous image compression methods. These methods can be conveniently divided into two classes, invertible and non-invertible methods. The invertible methods reduce redundancy but do not destroy any of the information present in the image. These methods transform the two-dimensional array into a form requiring fewer bits to store. The original two-dimensional array is generated by the inverse transformation prior to display. The regenerated image is identical to the original image.

Consider a gray-scale image which has been digitized to two gray levels, black and white. Such an image is often referred to as a binary image, since the gray level of each pixel is either a one or zero. Hence, the image consists of a two-dimensional array of bits. A one-dimensional list of bits can be generated from the two-dimensional array by copying, in order, each row of the two-dimensional array into the one-dimensional array.

It has been observed that the one-dimensional array has long runs of ones or zeros. Consider a run of 100 ones. One hundred bits are required to represent the run in the one-dimensional array. However, the same 100 bits could be represented by a 7-bit counter value specifying the length of the run and the value "one" specifying the repeated gray level. Hence, the 100 bits can be reduced to 8-bits. This is the basis of a transformation of the one-dimensional array in which the transformed image consisting of a sequence of paired values, each pair consisting of a count and a bit value.

One can define a compression ratio which is the ratio of the number of bits in the original two-dimensional array to the number of bits needed to store the transformed image. For typical binary images, compression ratios of the order of 5 to 10 can be obtained utilizing these methods. However, the gains obtained decrease rapidly as the number of gray levels is increased. At higher numbers of gray levels, the probability of finding repeated runs of the same gray level decreases. Each time the gray level changes, a new pair of values must be entered into the file. As a result, compression ratios exceeding 3 are seldom obtained for invertible compression of gray-level images.

Higher compression ratios can be obtained if non-invertible compression methods are utilized. In such methods, the image regenerated by the universe transformation is not identical to the original image.

Conventional error measures are of only limited value in comparing two non-invertible compression methods. For example, consider two transformations. The first transformation results in random noise being introduced into the regenerated image. That is, each pixel in the regenerated image differs from that in the original image by an amount which is randomly distributed between two values. The second transformation results in a constant having a value equal to the difference between these two values being added to each pixel in a narow band across the image. The second transformation introduces an error having a root-mean-squared error which is significantly less than that introduced by the first transformation. However, the regenerated image produced by the first transformation is far more agreeable or satisfactory to a human viewer than that produced by the second transformation.

The typical prior art non-invertible image compression methods can be divided into two steps. In the first step, two sets of coefficients, $p_i$ and $q_j$ are derived from the image by fitting the image to a linear expansion of the form $$I(x,y) = \Sigma_i p_i F_i(x,y) + \Sigma_j q_j G_j(x,y)$$

As will be explained in more detail below, the basis functions $F_i$ and $G_j$ are chosen such that the most "important" information contained in the image is represented by the p's and the least important information is represented by the q's. The transformation in question is invertible in the sense that given an N×N set of pixels, $I(x_i,y_j)$, one can determine a total of $N^2$ coefficients $p_i$ and $q_j$ that will exactly reproduce the $N^2$ values $I(x_i,y_j)$. Since there are $N^2$ pixels and $N^2$ coefficients, the set of coefficients requires the same number of bits to store as the image if the transform coefficients are stored to the same precision as the image pixel intensities. Hence, the transformation alone does not produce any compression of the image.

In the second step of the image compression method, the coefficients $p_i$ and $q_j$ are quantized. The number of bits used to represent each $p_i$ is greater than that used to represent each $q_j$, since the $p_i$ represent the most important information in the image. Thus the $p_i$'s will be able to be recovered more accurately than the $q_j$'s. The reduced precision utilized in the representation of the $q_j$'s and $p_i$'s are the source of the non-invertibility of the transformation.

For the above discussed technique to be useful, the image transformation must separate the information into coefficients having the property that the different sets of coefficients contain image information of different importance. It is known that the most subjectively important image information is contained in the low spatial frequency components of the image. Hence, the functions $F_i(x,y)$ must be limited in their spatial frequency response to lower frequencies than the functions $G_j(x,y)$. If this condition is satisfied, then the coefficients $p_i$ will represent more subjectively important information than the coefficients $q_j$.

In addition to the low spatial frequency information, specific images may have information in high-frequency components that is also important. Edges typically contribute to the high spatial frequency data. An image with a large number of edges oriented in a specific direction will therefore have a significant high-frequency component if one or more of the $G_j$ functions represents edges having the orientation in question. Hence, it would be advantageous to be able to divide the $G_j$ functions into sub-classes such that one or more of the subclasses can be quantized with increased accuracy when the coefficients associated with the sub-class indicate that a significant amount of information is contained in that sub-class.

In addition, systems of basis functions which reflect or approximate the structures found in typical images are more likely to require fewer items to represent an image with a given degree of fidelity. It is known that images tend to include structures having limit spatial extent which vary in intensity smoothly over the structure. Hence, sets of basis functions in which the $F_i$ can approximate compact objects having intensities which are proportional to low order polynomials, i.e., constants, linear, and quadratically varying surfaces, would be advantageous. If the basis functions are orthonormal, this is equivalent to requiring that at least the low order moments of each of the basis functions $G_i$ vanish.

To better understand the cause of the errors and the manner in which the transformation in the first step of the compression affects the type of errors, the manner in which the quantization is performed will now be discussed in more detail. To simplify the discussion, it will be assumed that only the $p_i$ coefficients are quantized to more than zero bits. That is, zero bits will be allocated for each of the $q_i$. It will also be assumed that each coefficient $p_i$ will be allocated K bits. Let $P_{min}$ and $P_{max}$ be the minimum and maximum values, respectively, of the set of parameters $\{p_i\}$. In the simplest case, $2^K$ equally spaced levels, denoted by $L_j$, are defined between $P_{min}$ and $P_{max}$. Each coefficient $p_i$ is then replaced by an integer, k, where $L_k \leq P_i < L_{k+1}$. These integers, or a suitably coded version thereof, are stored in place of the coefficients, $p_i$.

An approximation to the image, $I'(x,y)$ can be reconstructed from the compressed representation, where $$I'(x,y) = \Sigma_i p'_i F_i(x,y)$$

where, for purposes of illustration, $p'_i = (L_k + L_{k+1})/2$. Here, k is the integer stored in place of $p_i$.

From the above discussion, it will be apparent that an error of as much as half of the level spacing may be introduced by this quantization procedure. The above example set the levels with reference to $P_{min}$ and $P_{max}$ to simplify the discussion. Other methods for placing the $2^K$ levels so as to minimize the overall error resulting from the quantization process are known in the art. In general, these methods utilize the variance of the set of values $\{p_i\}$ and the statistical distribution of the values to set the level spacing. In this case, the level spacing is proportional to the variance. Hence, the larger the variance, the larger the quantization error. In general, the variance is determined by the image being quantized and the invertible transformation used to calculate the coefficients.

Hence, it is advantageous to provide an invertible transformation which minimizes the variance of the coefficients to be quantized. For a given image, it can be shown that the variance of the sets of coefficients $\{p_i\}$ and $\{q_j\}$ will be reduced if the basis functions $F_i(x,y)$ and $G_j(x,y)$ form an orthonormal basis for the two-dimensional image space.

The above described properties of the image transformation allow one to reduce the errors introduced at the quantization stage. However, there will always be errors. The manner in which these errors influence the reconstructed image will depend on the basis functions $F_i(x,y)$ and $G_j(x,y)$. It is useful to distinguish the various classes of basis functions by the fraction of the image over which each of the basis functions is non-zero. This will be referred to as the support of the basis function.

If the basis functions have support which is of the same order of size as the image itself, then a quantization error in one coefficient will affect every point in the reconstructed image. This leads to aliasing errors in the reconstructed image. Such errors are subjectively very objectionable. For example, a quantization error in a single coefficient could lead to "stripes" extending across the entire reconstructed image.

A second problem occurs with basis functions having large support. As noted above, images tend to contain structures whose spatial extent is small compared to the size of the image. To represent such a structure with basis functions that have support which much larger than the structure in question often requires the superposition of many such basis functions. Hence, the number of coefficients which contain useful information is likely to be larger if basis functions having support which is much larger than the objects found in the image are used.

If, on the other hand, the basis functions have support which is small, then such a quantization error will only affect a small area of the reconstructed image. This leads to errors which are more like random noise. As noted above, random noise errors can be incurred without producing a subjectively objectionable image.

The quantization errors are also related to the transform's ability to concentrate the essential image information into a set of coefficients which requires the smallest number bits to represent. The number of bits needed to represent the image is the sum of two numbers. First, bits must be allocated to communicate the values of the coefficients produced by the transform which are saved for use in reconstructing the image. The second number is the number of bits needed to communicate which of the possible coefficients were saved after transformation. For any given compression ratio, the number of available bits is fixed. Bits used for labels are unavailable for storing coefficient values. Hence, if a significant number of bits are needed for storing the label information, the quantization will be done with fewer bits which results in larger quantization errors.

In general, the transformation of an N×N image can produce $N^2$ coefficients. The coefficients could be listed by giving a label specifying the identity of the coefficient and a number representing the value of the coefficient for each coefficient. If the transformation is effective, most of these coefficients will be zero. The minimum number of bits needed to represent the useful coefficients in this format would be the number needed to specify the label associated with each non-zero coefficient and the number of bits needed to adequately represent the value of that coefficient. One problem with this type of representation is the number of bits needed to communicate the labels.

Consider a 1000×1000 pixel image in which each pixel is digitized to 8 bits, i.e., 256 gray levels. Suppose a transformation were available which produced only 1000 coefficients that were non-zero out of the possible 1,000,000. Assume further that these coefficients are to be digitized to be quantized to 8 bits. To specify the identity of each coefficient will require approximately 20 bits. Hence the total number of bits needed to specify the image in the compressed format would be 28,000 bits. As a result, a compression ratio of less than 300:1 is obtained. In principle, a compression ratio of 1000:1 would be obtainable if one did not have to allocated bits for storing the labels.

Hence, in addition to concentrating the image information into a small number of coefficients, the transformation coefficients in question should form a subset whose identity does not depend on the specific image being transformed. In this case, the entire subset is quantized. Since the position of the coefficient in the subset is equivalent to a label, there is no need to allocate bits for a label specifying the identity of each coefficient.

Prior art methods make use of the observation that the most important information appears to be concentrated in the low spatial frequencies for images. In prior art compression methods, the image is typically transformed to produce one set of coefficients representing the low frequency information and a plurality of sets of coefficients representing different high spatial frequency information. The individual sets are then quantized with differing degrees of precision. The only labeling information is then that required to identify the individual subsets. In this manner, the information needed to specify the "label" for each coefficient is reduced.

This reduction in label storage bits, however, results in an increase in the number of bits needed to represent the coefficients. In this scheme, any given subset is treated as a unit. Hence, all of the coefficients in a particular subset must be quantized if any of the coefficients contains significant information.

Thus, it is advantageous to have a transformation which provides as much flexibility as possible in grouping the coefficients into subsets prior to quantization. In the simple transformation described above, an N×N image is transformed to provide $N_p$ low frequency coefficients, $p_j$ and $N_q$ high frequency coefficients, $q_j$. Ideally, one would like to find the smallest $N_p$ for which all of the useful information was in the $p_j$'s. In this case one would merely quantize the $p_j$ ignore the second subset, i.e., the $q_j$'s.

As a result, it is advantageous to provide a transformation that allows one to chose the ratio of $N_p/N_q$. In general, image transformations do not allow one to set this ratio with arbitrary precision. Instead, one is presented with a number of steps in which the ratio changes by some factor. Therefore, transformations in which the factor in question is smaller are more desirable than those in which the factor is larger.

Although a number of transformations have been utilized in the prior art, none have provided all of these advantageous features. For example, one class of transformations is based on the Fourier expansion for the image transformation. The Fourier series basis functions have the advantage of providing an orthonormal basis for the image space. However, these functions have a number of disadvantages. First, the support of every Fourier basis function is the entire image. That is, each basis function is contributes to the entire image. As a result, quantization errors tend to produce aliasing errors which are subjectively unsatisfactory. Second, the computational work load to compute the Fourier transform is of order nlog(n), where n is the number of pixels in the original image. To overcome this difficulty, the image is often divided into smaller sub-images which are pieced together after reconstruction. This procedure reduces the computational work load, but leads to other undesirable artifacts in the reconstructed image.

A second prior art solution to the image transformation problem is taught in U.S. Pat. No. 4,817,182 by Adelson, et al. In the method taught by Adelson, et al., the image is processed by a quadrature mirror filter bank (QMF) to produce four filtered images which are, in reality, four sets of coefficients. Three of the sets of coefficients are analogous to the $q_j$ discussed above in that they represent high spatial frequency information. The fourth set of coefficients is analogous to the $p_j$ in that these coefficients represent low-frequency information. The number of coefficients in each set is the same. Adelson, et al. teach treating the low-frequency components as an image of one quarter the size and then reprocessing the low-frequency coefficients using the same QMF. This iterative procedure leads to a pyramid of coefficient sets with a low-frequency set at the top and three sets of high-frequency coefficients at each level below the top. Each level represents information having higher frequency than the level above it.

It may be shown that this method is equivalent to the transformation discussed above with the $q_j$ being further divided into different subsets. Although Adelson, et al. refer to their QMF method as being equivalent to expanding the image in an orthonormal basis set, this method does not provide the claimed orthonormal expansion. The basis functions corresponding to a QMF are, by definition, symmetric. Using this property of the QMF basis functions, it can be shown that the QMF basis functions can not be an orthonormal set. Hence, this method does not provide the advantages of an orthonormal transformation of the image.

Another problem with the method taught by Adelson, et al. is that no means for selecting the QMF filter in terms of the image properties is taught. As a result, the basis functions taught therein do not optimally represent smoothly varying image features. For example, these basis functions can not exactly represent quadratic surfaces.

A still further problem with the method taught by Adelson, et al. is the inability to finely tune the compression ratio. Each time the filtering operation is applied, the number of coefficients in the $\{p_i\}$ set decreases by a factor of four. Hence, one only has the option of choosing compression ratios which differ by a factor of four if only the $\{p_i\}$ are to be quantized. As a result, one must accept a very low compression ratio or devise a strategy for determining which of the sets of $\{q_j\}$ are to be quantized.

Broadly, it is an object of the present invention to provide an improved apparatus and method for coding an image such that the coded image can be represented in fewer bits than the original image.

It is a further object of the present invention to provide an apparatus and method which utilize an orthonormal transformation of the image.

It is yet another object of the present invention to provide an apparatus and method in which the transformation utilizes basis functions having support which is small compared to the size of the image.

It is a still further object of the present invention to provide an apparatus and method in which the compression ratio may be selected in increments other than factors of four.

It is yet another object of the present invention to provide an apparatus and method in which the transformation utilizes basis functions that can adequately represent smoothly varying images such as low order polynomials.

It is a still further object of the present invention to provide an apparatus and method in which the transformation allows the high-frequency basis functions to be divided into a greater number of sub-classes than the prior art image compression transformations.

These and other objects of the present invention will become apparent to those skilled in the art from the following detailed description of the invention and the accompanying drawings.

SUMMARY OF THE INVENTION

The present invention comprises an apparatus and method for coding a two-dimensional data array. The invention utilizes a transformation of the data array in which said data array is expanded as a series of two-dimensional irreducible basis functions representing the high and low-frequency components of the data array. The coefficients of this series, after suitable quantization, comprise a representation of the data array which requires fewer bits to store than the original data array. An approximation of the original data array may be generated from the quantized coefficients utilizing the inverse transformation.

The transformation is specified in terms of a 2×2 scaling matrix S and a set of two-dimensional scaling coefficients. Different transformations may be specified by altering the scaling matrix and/or the scaling coefficients.

Detailed Description of the Invention

Figure 1:
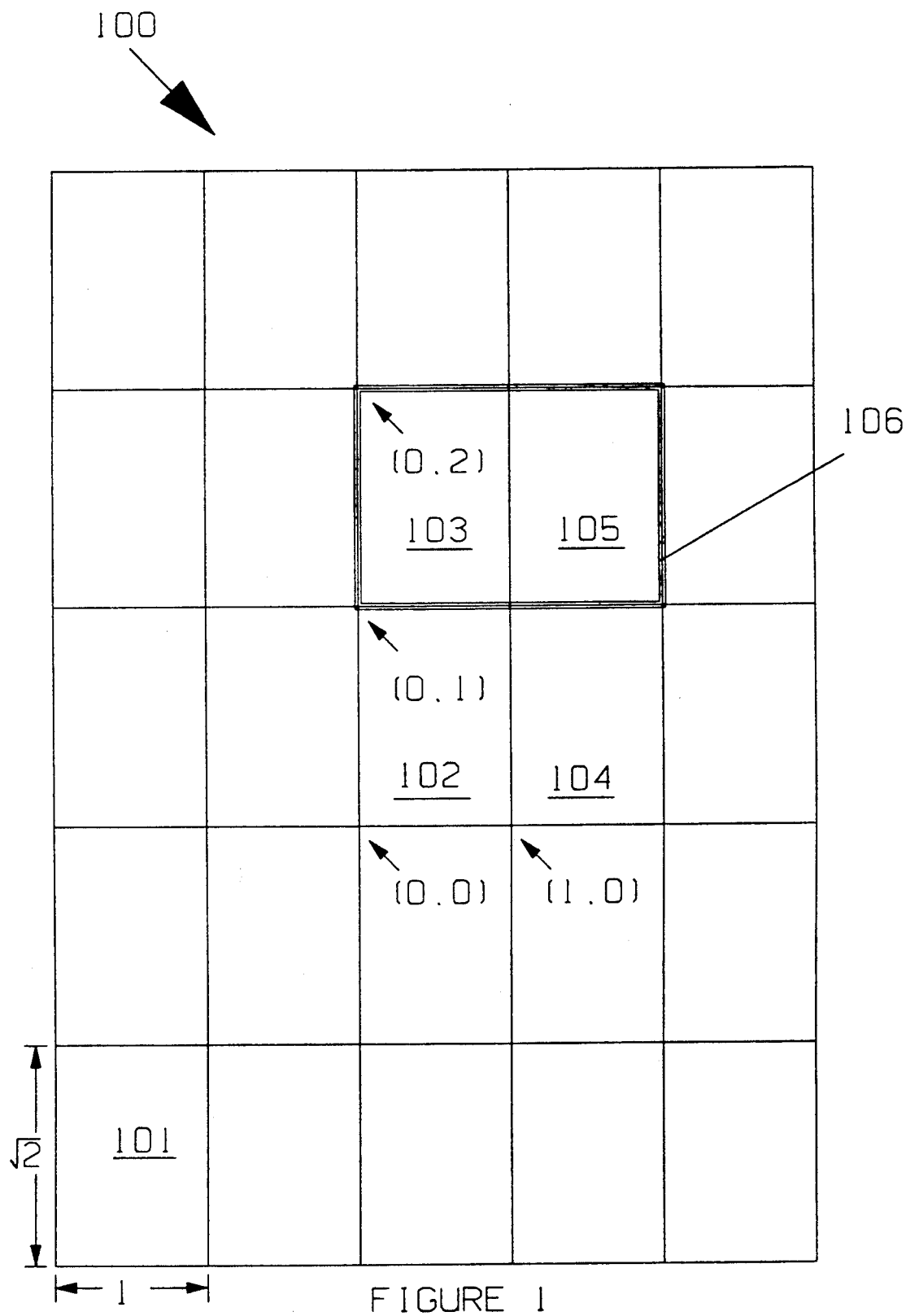
FIG. 1 illustrates a number of rectangular detectors.

The present invention will be discussed in terms of an image compression apparatus and method; however, it will be apparent to those skilled in the art that the coding scheme described herein is applicable to any situation in which a hierarchical coded representation of an image is required and the hierarchy is to be based on differing spatial frequencies. It will also be apparent to those skilled in the art that the present invention may be utilized to transform and/or compress any two dimensional array of data, not just those arrays corresponding to images.

Consider an image having an intensity distribution denoted by I(x,y) when projected on a surface on which a location is specified by providing the Cartesian coordinates (x,y) of the location. Assume that the surface in question is tiled with identical photodetector elements placed on a grid. The grid points will be denoted by (i,j) in the following discussion. The outputs of the detector elements are measured and the results are stored in an array denoted by $I_{i,j}$ where i and j each run from 1 to N.

As noted above, the goal of an image compression method is to decompose I(x,y) into two distributions, denoted by $I_L(x,y)$ and $I_H(x,y)$, wherein $I_L(x,y)$ represents the generally low spatial frequency information in the image and $I_H(x,y)$ represents the generally high spatial frequency information. Each of the functions is then approximated by a digital representation in which more bits are allocated to the representation of $I_L(x,y)$ than are allocated to the representation of $I_H(x,y)$. As noted above, the representation of $I_H(x,y)$ may be further divided into sub-sets which are allocated different numbers of bits.

It should be noted that the set of measurements $I_{i,j}$ is not sufficient to uniquely define the intensity distribution I(x,y). All that is known from the set of measurements is the average value of I(x,y) over the area of each detector element. The simplest assumption that can be made about I(x,y) is that it is constant in intensity over each detector element. That is, one assumes that $$I(x,y) = \Sigma_{i,j} I_{i,j}^1 F_{i,j}(x,y) \qquad (1)$$

Here, $^1F_{i,j}(x,y)$ is the photodetection efficiency of a single detector element located at grid point $(i,j)$. This function is one for $(x,y)$ values that are covered by the detector in question and zero elsewhere.

One method for constructing the low-frequency version $I_L(x,y)$ would be to calculate the representation of $I(x,y)$ that would be obtained if the detector elements were M times bigger. The intensity distribution obtained using these bigger detector elements can be easily calculated from that obtained using the smaller elements. One merely sums the intensity values on M adjacent elements. Each detector now measures the average of the intensity values measured by the original detector elements from which it is constructed. Hence, the image measured by the larger detectors has been filtered to remove some of the high frequency information.

There is, however, a problem in defining the labels for the new intensity measurements. Since the new detectors are larger, there is not one detector centered over each grid point. For reasons that will be discussed below, it will be assumed that the shape of the detector elements and M are chosen such that the detector obtained by combining the M detector elements is of the same shape as a single detector element and that the larger detector is located at a grid point of the original grid system. In this case, $$I_L(x,y) = \Sigma_{i,j} {}^M I_{i,j} {}^M F_{i,j}(x,y) \qquad (2)$$

Here, $^M I_{i,j}$ is the intensity measured by the combination of the M detector elements and $^M F_{i,j}(x,y)$ is a function that is one if $(x,y)$ is located inside one of the M detector elements and zero elsewhere. The manner in which these quantities are labeled to provide a correspondence between the labels associated with the individual detectors on the original grid and the larger detectors located on a sub-set of the original grid will be discussed in more detail below.

The high spatial frequency function $I_H(x,y)$ is the difference of $I(x,y)$ and $I_L(x,y)$. It can be shown that this function can be expanded as a series of functions $^M G_{i,j}(x,y)$, one such function being associated with each grid point on which a larger detector is located. That is, $$I_H(x,y) = \Sigma_{i,j} {}^M C_{i,j} {}^M G_{i,j}(x,y) \qquad (3)$$

where the parameters $^M C_{i,j}$ are related to differences of the intensity measurements $I_{i,j}$. These functions will be discussed in more detail below. For each term in the expansion shown in Eq. (2) there are M-1 corresponding terms in Eq. (3).

If Eqs. (1), (2), and (3) are combined, one obtains $$\Sigma_{i,j} I_{i,j} {}^1 F_{i,j}(x,y) = \Sigma_{i,j} {}^M I_{i,j} {}^M F_{i,j}(x,y) + \Sigma_{i,j} {}^M C_{i,j} {}^M G_{i,j}(x,y) \qquad (4)$$

As noted above, the goal is to obtain an expansion of the image in terms of two sets of functions. The first set of functions has a lower spatial frequency response than the information in the original image and the coefficients of the expansion can be coded with approximately the same precision as the pixels of the original image. The second set of functions has a higher frequency response. Eq. (4) provides such an expansion. The first set of functions corresponds to $^M F_{i,j}(x,y)$. The number of coefficients in the first sum is 1/M the number of pixels in the original image. Hence, the low-frequency sum can be represented in fewer bits than the original image. For example, if the original image were digitized to 8 bits, one could store the $^M I_{i,j}$ values as 8-bit quantities. In this case, the storage requirements for the low-frequency representation would be 1/M of that for the original image.

Since the functions $^M G_{i,j}(x,y)$ are derived from the difference between the original image and a low-frequency expansion thereof, these functions must represent high spatial frequency information. In the simplest case, no storage is allocated for this data at all. Alternatively, the coefficients $^M C_{i,j}$ could be stored with some reduced number of bits. It can be shown that there are (M − 1) terms in the high-frequency expansion for each term in the low-frequency expansion. As long as the number of bits used to store the high-frequency coefficients totals less than (M − 1)/M that used in digitizing the original image, a net image compression will have been achieved.

It should also be noted that the functions $^M F$ and $^M G$ can be selected to form an orthonormal basis for the image plane; hence, the coefficients of this series expansion will have a reduced variance relative to a non-orthonormal expansion. Furthermore, the support of the $^M F_{i,j}$ is M detectors which is presumably much less than N. Hence, the basis functions have the desired property of compact support.

Finally, it should be noted that the process can be iterated. The parameters $^M I_{i,j}$ can be interpreted as intensity values of an "image" which is to be substituted into the right side of Eq. (4) in place of $I_{i,j}$ and a new expansion having a low-frequency expansion with $1/M^2$ of the terms in the original image can be obtained.

To simplify the following discussion, the ratio of the number of pixels in the original image to the number of coefficients in the final low-frequency expansion will be referred to as the simple image compression ratio. This is the image compression ratio that would be obtained if each of the low-frequency coefficients were quantized to the same number of bits as used to represent each of the pixels in the original image, and the high-frequency coefficients were not quantized.

In general, the optimum image compression ratio will vary from image to image. Here, an image compression ratio is considered optimum if three conditions are met. First, the reconstructed image has the required image quality. Second, considerations such as acceptable computational work-load are satisfied. And third, there is no other compression ratio which meets these conditions and provides a representation requiring significantly fewer bits to store the image.

As noted above, prior art image-coding schemes have limited the user to simple image compression ratios $4^k$, where k is the number of times the coding procedure is iterated. In this case, only image compression ratios of 4, 16, 64, etc., may be utilized without quantizing at least some of the high-frequency coefficients. Consider an image for which the optimum simple image compression ratio happened to be 32. If the prior art schemes are utilized, the user has two alternatives. First, a simple image compression ratio of 16 could be utilized with none of the high-frequency coefficients being quantized. This is clearly less than optimal. Second, a simple image compression ratio of 64 could be utilized with some of the high-frequency coefficients quantized in addition to the low-frequency coefficients. This latter method is only effective, however, if the information that was not adequately represented by the low-frequency components is concentrated in some small identifiable sub-set of the high-frequency coefficients. This condition is often not satisfied.

Hence, it would be advantageous to be able to specify the simple image compression ratios in finer steps. This can be accomplished by selecting a coding scheme that has an M more nearly equal to the simple image compression ratio in question. Alternatively, a coding scheme with a small M could be iterated a number of times. In either case, a simple compression ratio which is equal to any integer can be provided by the present invention.

The permitted values of M depend on the assumed shape of the detector elements, i.e., the functions $^1F_{i,j}(x,y)$ in Eq. (1). Most detectors used in measuring images are square. The lowest value of M which is compatible with a square detector is 4, since the smallest number of squares that can be combined to produce another square is 4.

One observation which is inherent in the present invention is that one is not restricted to functions $^1F_{i,j}(x,y)$ which are non-zero only on a square even if the detectors used to measure $I_{i,j}$ were square. One is given a set of measurements, $I_{i,j}$. It can be imagined that this set of measurements were the average intensity obtained by a detector having an arbitrary shape. In fact, it has been found that by choosing a different detector shape, one can achieve M values that can not be achieved by prior art schemes.

There are, however, restrictions on the permitted detector shapes. First, the array of detectors must be capable of providing signals which represent any image projected on the plane. This implies that the detectors must completely cover the projection plane. Consider an image consisting of a single point of light. If the image were to fall between detectors, the array of detectors could not be used to represent the image. Hence, every point on the projection plane must be included in some detector.

Second, the detectors should be identical in shape. If this is not the case, the resolution of the image will depend on the location at which it is projected on the surface.

Third, sets of M detectors must be capable of being grouped such that the combination of the M detectors is itself a detector having the same shape but M times the area. In addition, the location of the combined detector must be located at one of the grid points.

The following discussion will be simplified by the introduction of vector and matrix notations. Vectors and matrices will be shown in bold type to differentiate these quantities from simple numbers. A point in the image plane having Cartesian coordinates (x,y) will be denoted by the vector x. An integer vector is defined to be a vector in which both of the components are integers. That is, the integer vector k is equivalent to the vector (k₁, k₂), where k₁ and k₂ are both integers.

To better understand the present invention, the case in which M is 2 will be discussed in detail. Then, the more general case in which M > 1 will be discussed. The shape of the photodetector will be denoted by the function $\phi(x)$. That is, $\phi(x)=1$ if x lies within the detector and $\phi(x)=0$ if x lies outside the detector. Two such detectors must be combinable to form a larger detector having the same shape.

The detectors in question tile the xy-plane. That is, the detectors cover the plane without gaps or overlaps. In addition, the detectors are located on grid points which may be labeled with integer vectors k. Consider the detector located at the origin, i.e., grid point (0,0). It is to be combined with a detector located at a grid point q which, for the purposes of simplicity, will be assumed to be one of the grid points adjacent to the origin such as (1,0). The combined detector is to be of the same shape as each of individual detectors. However, as will become clear from the following discussion, the combined detector may be rotated relative to the other detectors. In addition, the combined detector must be located at a grid point. These requirements may be expressed mathematically as follows:

$$\phi(x) = \phi(Sx) + \phi(Sx - q) \quad (5)$$

$$Sk = k' \quad (6)$$

and $$|\det S| = 2 \quad (7)$$

where k' and k are any integer-valued vectors and S is a 2×2 matrix. Eq. (5) states, in effect, that two small detectors which are separated by q may be rotated and combined to form a larger detector having the same shape. Eq. (6) requires that any integer vector is mapped to another integer vector by the matrix S. This guarantees that the combined detector will be located at one of the grid points at which the smaller detectors were located. The absolute value of the determinant of S must be equal to 2 to guarantee that the combined detector has twice the area of the individual detectors.

There are three possible detector shapes which satisfy these conditions in the case of a pairwise grouping of adjacent detectors. The simplest detector shape is a rectangle having sides in the ratio of $\sqrt{2}:1$. Two such detectors placed side by side have the same shape as a single detector rotated by 90 degrees.

This first detector shape is illustrated in FIG. 1 at 100. FIG. 1 illustrates a number of rectangular detectors having sides in the ratio of $\sqrt{2}:1$. These dimensions are shown explicitly on detector 101. Each detector can be identified by an index associated with its lower left-hand corner. Detector 102 is associated with grid point (0,0); detector 103 is associated with grid point (0,1), and so on. Consider the detector 106 obtained by combining detectors 103 and 105. This detector has one side with length 2 and one with length $\sqrt{2}$. Hence, the sides are in the ratio $\sqrt{2}:1$. If the short side is defined to be the base, detector 106 can be viewed as being a detector of twice the area which has been rotated by 90 degrees relative to the single area detectors. Its lower left hand corner is located at grid point (0,2); hence it satisfies the condition that it also lies on a grid point.

Figure 2:
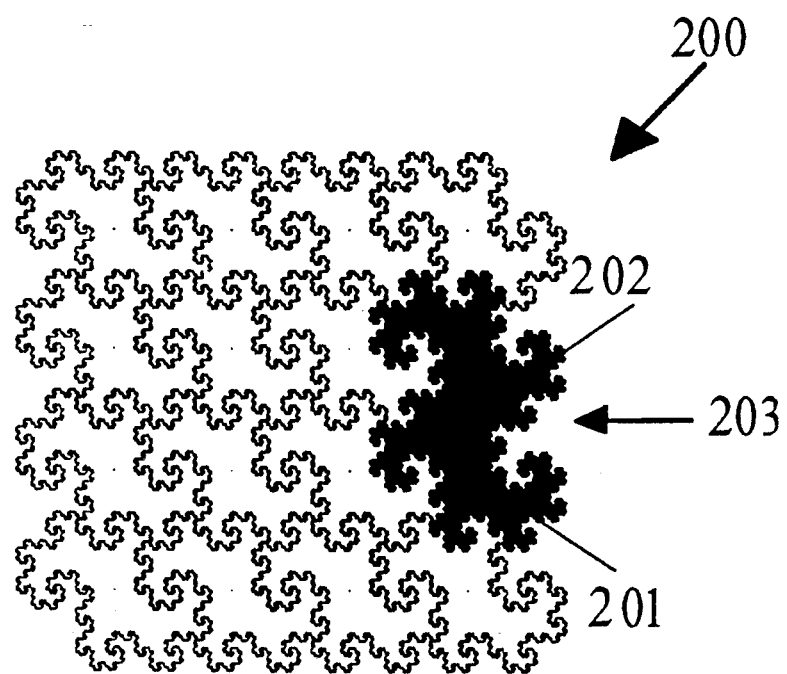
FIG. 2 illustrates a surface which is tiled with "twin-dragon" shaped detectors.
Figure 3:
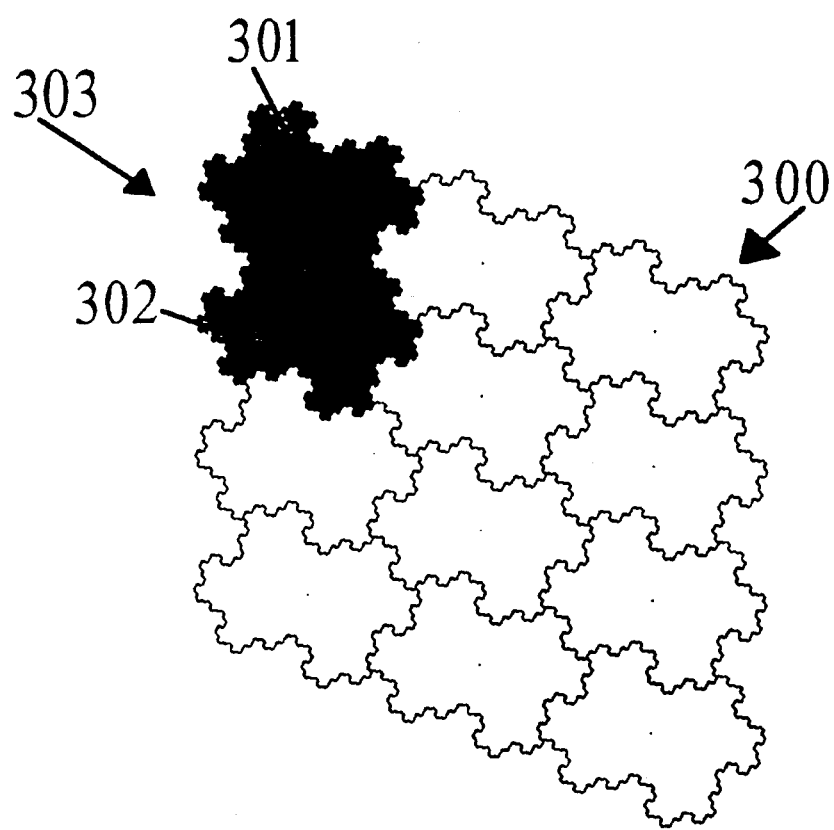
FIG. 3 illustrates a surface which is tiled with "no-von" shaped detectors.

The two other possible shapes are fractals which will be referred to as "twindragon" and "novon" respectively. These shapes are shown in FIGS. 2 and 3, respectively. FIG. 2 illustrates a surface 200 which is tiled with twindragon shaped detectors of which detectors 201 and 202 are typical. It will be seen that the larger detector 203 obtained by combining detectors 201 and 202 is itself a twindragon shaped detector located at the same grid point as detector 201. The combined detector is rotated by an angle of 45° relative to the single detectors. Similarly, FIG. 3 illustrates a surface 300 which is tiled with novon shaped detectors of which detectors 301 and 302 are typical. The larger detector 303 obtained by combining detectors 301 and 302 is itself a novon shaped detector located at the same grid point as detector 301. In this case, the combined detector is rotated by an angle of arctangent ($\sqrt{7}$) which is approximately equal to 69.295° relative to the single detectors.

It should be noted that the grid on which the detectors are located is specified by the detector shape. It will become apparent from the following discussion that the actual shape of the detectors need never be explicitly calculated. Once a grid has been defined, a transformation for assigning a grid point to the combination of M detectors is specified in terms of a matrix S and the vector q. The absolute value of the determinant of S is 2. In the following discussion, the absolute value of the determinant of S will be referred to as the multiplier. Matrix S maps each possible integer vector to another integer vector. Each possible such mapping corresponds to a different "detector shape". However, only the mapping and the vector q appears explicitly in the method of the present invention. As will be discussed in more detail below, q is measured in grid coordinates not distance between grid points. That is, $q=(q_x,q_y)$ represents the number of grid points in the x and y directions to move to find the detector to be combined with the detector at the origin.

It can be shown that the elements of S must be integers. For the case in which two detectors are combined, the possible matrices can be made to have the following form after a change of coordinates:

$$S = \begin{bmatrix} 0 & -2 \\ 1 & \sigma \end{bmatrix} \quad (8)$$

Here, $\sigma$ has may have the values 0, ±1, and ±2 which correspond to the rectangle, novon, and twindragon cases discussed above. In addition, the scaling matrix $$S = \begin{bmatrix} 0 & 2 \\ 1 & 0 \end{bmatrix} \quad (9)$$

also satisfies the above stated conditions. This matrix will hereinafter be referred to as the "negarectangle" case. The associated detector is the same as detector 100 shown in FIG. 1.

Refer again to Eq. (4). Before demonstrating how the present invention calculates the low-frequency image coefficients and the high-frequency coefficients, Eq. (4) must be rewritten in a form consistent with the vector notation introduced above. In this notation, Eq. (4) becomes $$\Sigma_k I_k {}^1F_k(X) = \Sigma_k {}^2I_k {}^2F_k(X) + \Sigma_k {}^2C_k {}^2G_k(X) \quad (10)$$

Here the sums are performed over all of the grid points k. $I_k$ is the measured array of pixel values.

The matrix S is used to specify the elements which are added and substracted to produce the low-frequency image and high-frequency coefficients shown in Eq. (10). It can be shown that $$^2I_m = (I_{Sm} + I_{(Sm+q)})/2 \quad (11)$$

Here, q specifies the location of the second detector relative to the first detector which is located at grid point m. Since the choice of direction for the x-axis in the grid system is arbitrary, q is normally taken to be (1,0). Eq. (11) is repeated for each grid point m. Similarly, it can be shown that the high-frequency coefficients are given by $$^2C_m = (I_{Sm} - I_{(Sm+q)})/2 \quad (12)$$

As noted above, the transformation of Eq. (10) can be iteratively applied to produce further compressed images. To do this, one need only replace the $I_m$ terms on the right hand side of Eqs. (11) and (12) with the $^2I_m$ obtained from the previous application of Eq. (11). Each time the transformation is applied, another high-frequency set of coefficients is obtained and a new low-frequency set of coefficients is produced which may be used in the next iteration. The number of coefficients in each new set is approximately one half that of the previous set. It should be noted that Eqs. (11) and (12) do not explicitly depend on the shape of the detectors. Nor do they explicitly depend on irrational numbers. Only the transformation matrix S appears. However, the shape of the detectors is mathematically implicit in the transformation matrix so that one is, in effect, always working with the detectors. Hence, the decomposition of the image into a low-frequency set of coefficients and a number of high-frequency sets of coefficients is accomplished without ever explicitly calculating the shape of the detectors being used. In addition, the matrices are more conveniently stored than the actual detector shape.

As will be discussed in detail below, the transformation shown in Eqs. (11) and (12) may be reversed. That is, given a set of low-frequency coefficients $^2I_m$ and a set of high-frequency coefficients $^2C_m$, an image $K_m$ may be generated from linear combinations of the $^2I_m$ and $^2C_m$. If the low and high frequency coefficients resulted from the decomposition of an image $I_m$ using the transformation shown in Eqs. (11) and (12) then $K_m = I_m$.

The simple transformation shown in Eqs. (11) and (12) is useful in image compression. However, higher compression ratios may be obtained with the same root-mean-squared error if the more general forms of the transformation described below are utilized.

To understand the limitations of this simple embodiment of a transformation according to the present invention, one must examine the assumptions inherent in Eq. (4). In constructing this equation, it was assumed that the image was constant over each of the detectors. That is, the image was assumed to be a histogram. Most images vary smoothly. The approximation in question does not, since it changes abruptly at the edge of each detector. These abrupt changes are equivalent to introducing spurious high-frequency information into the image. The presence of high-frequency information reduces the obtainable compression ratios, as a significant number of bits must be used to code the high-frequency coefficients representing this information. If this information is not retained, reconstruction artifacts will be produced.

One solution to this problem is to "filter" both sides of Eq. (4), thereby smoothing abrupt changes in intensity. Such a smoothing operation can be performed by replacing each of the basis functions in Eq. (4) by a weighted linear superposition of other basis functions. If the weight values are chosen as described below, the basic form of Eq. (4) will be as described above. That is, the new basis functions will still form an orthonormal set and Eq. (4) will be satisfied. However, the relationships between the $^2I_m$, $^2C_m$, and the $I_m$ will be altered as described below. In addition, the new basis functions may be chosen to have additional properties which are useful in representing certain types of images. For example, the new basis functions $G_j$ can be chosen to have vanishing low-order moments. These additional properties can be used to further reduce the number of bits needed to represent a given image to a predetermined accuracy.

This more general embodiment of the present invention will now be described in detail with reference to the case in which S has a determinant with an absolute value of 2. To simplify the following discussion, the absolute value of the determinant of S will be referred to as the multiplier of the transformation. The generalization of the present invention to higher multipliers, i.e., $|\det S| > 2$, will be described in more detail below.

The present invention is defined in terms of a set of scaling coefficients $\{a_p\}$. Here, p is an integer valued vector, $(p_1, p_2)$. The scaling coefficients may be complex numbers. In general, $a_p$ will be non-zero for only a small number of the possible p values. The number of non-zero values is preferably small. First, the computational workload in performing the transformation is proportional to this number. Second, the support of the corresponding basis functions is related to the number of non-zero scaling coefficients. Hence, the area of the reconstructed picture which is affected by a quantization error in one of the coefficients is also related to this number.

For the transformation to provide a division into low and high frequency components and to be invertible, the scaling coefficients must satisfy $$\Sigma_p a_p = M \qquad (13)$$

Here, $a_p$ are summed over all possible integer vectors for which $a_p$ is non-zero, and $M = 2$.

As noted above, it is advantageous to use a transformation in which the basis functions form an orthonormal set. It can be shown that this is requires that $$\Sigma_p a_p{}^* a_{p+Sq} = M\delta_{q,0} \qquad (14)$$

Here, (*) indicates complex conjugation, and $\delta_{q,0}$ is the conventional delta function which is equal to 1 if $q = 0$ and 0 otherwise. In general, $\delta_{x,y}$ is 1 if $x = y$ and 0 otherwise. The summation is carried out for those values of p for which $a_p$ are non-zero. Here, M is equal to 2.

The simple case of pairwise combination of two detectors corresponds to the case in which only two of the $a_p$ are non-zero. In this case $a_0 = a_q = 1$, and q is one of the grid points adjacent to 0. Since these values satisfy equations (13) and (14), the case discussed above is an example of a coding transformation according to the present invention.

The manner in which scaling coefficients satisfying Eqs. (13) and (14) are chosen will be discussed in detail below. For the purposes of the present discussion, it will be assumed that a set of scaling coefficients satisfying these constraints is known.

The present invention is defined in terms of four elementary components. Two of these are used to decompose an image into low and high-frequency coefficient arrays. These components will be referred to as the Low-Frequency Projector and High-Frequency Projector, respectively. The remaining two components are used to reconstruct an image from such a decomposition. These components are referred to as Low-Frequency Injector and High-Frequency Injector.

Given a data array $I_m$, the Low-Frequency Projector generates a Low-Frequency Projection array $v_m$ with respect to the array of scaling coefficients $a_m$ and the scaling matrix S according to the formula $$v_m = (\Sigma_k a_k {}^* I_{Sm+k})/M \qquad (15)$$

Here, k runs over all values for which $a_k$ and $I_{Sm+k}$ are non-zero. If the array $I_m$ has N elements, the Low-Frequency Projection array will have approximately N/2 elements. The actual number of elements in the array will be N/2 only for an infinitely large image. For finite images, the number of elements in the array will differ slightly from N/2. The number will depend on the assumptions made about the values of the image elements which are outside the image array. Eq. (15) is repeated for each possible value of m.

Figure 5:
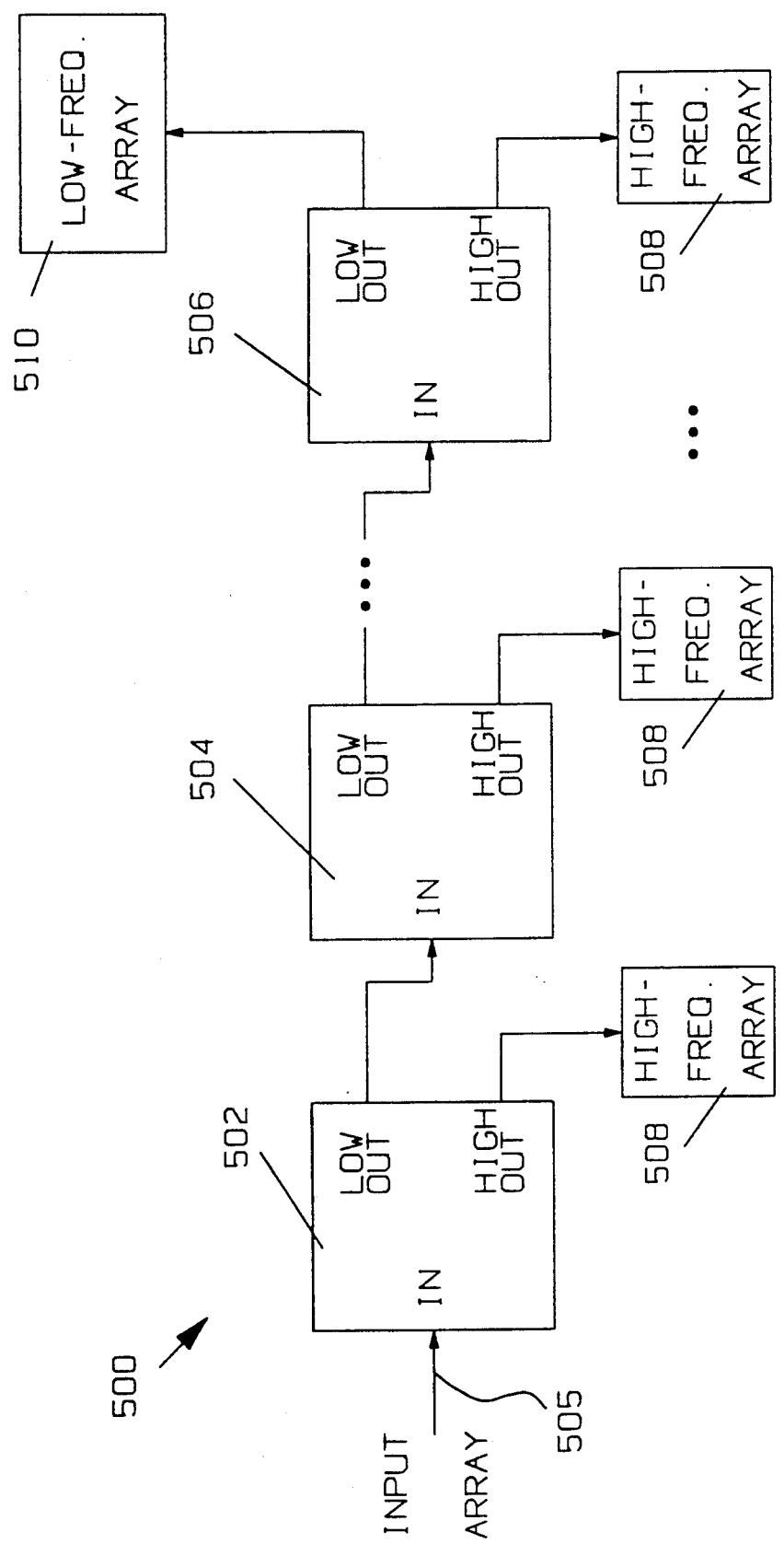
FIG. 5 illustrates an apparatus for decomposing an image into low-frequency and high frequency arrays using a plurality of multiplier two analyzer modules.

Given a data array $I_m$, the High-Frequency Projector generates a High-Frequency Projection array $^1w_m$ with respect of the array of scaling coefficients $a_m$ and the scaling matrix S according to the formula is shown in FIG. 5 at 500. Apparatus 500 has an input analyzer module 502, one or more optional intermediate analyzer modules 504, and an output analyzer module 506. Input analyzer module 502 receives an image 505 as its input. The low-frequency array generated by each analyzer module becomes the input of the next analyzer module in the series. If there are K analyzer modules in apparatus 500, K high-frequency arrays 508 and one low-frequency array 510 are generated. If the original image has N elements, low-frequency array 510 will have approximately $N/2^K$ elements.

If the decomposed image is to be the basis of an image compression system, low-frequency array 510 is quantized. In addition, one or more of the high-frequency arrays 508 may be quantized. It should be noted that a specific high-frequency array is not to be quantized, then the High-Frequency Projector used to generate that array may be omitted from the analyzer in question. This results in a decrease in the workload and hardware required to compute the compressed image.

The "injectors" reverse the transformations performed by the "projectors". Given a data array $v_m$, the Low-Frequency Injector generates an array $^L I_m$ with respect to the array of scaling coefficients $a_m$ and the scaling matrix S according to the formula $$^L I_m = \Sigma_k a_{m-Sk} v_k \qquad (18)$$

Here, k runs over all values for which $a_{m-Sk}$ and $v_k$ are non-zero. If the array $v_m$ has L elements, the array $^L I_m$ will have approximately 2 L elements. Eq. (18) is repeated for each possible value of m.

Given a data array $w_m$, the High-Frequency Injector generates an array $^{H[1]}I_m$ with respect of the array of scaling coefficients $a_m$ and the scaling matrix S according to the formula $$^{H[1]}I_m = \Sigma_k {}^1 a_{m-Sk} w_k \qquad (19)$$

Here, k runs over all values for which $^1 a_{m-Sk}$ and $w_k$ are non-zero. If the array $^1 w_m$ has L elements, the array $^{H[1]}I_m$ will have approximately 2L elements. Eq. (19) is repeated for each possible value of m.

Figure 6:
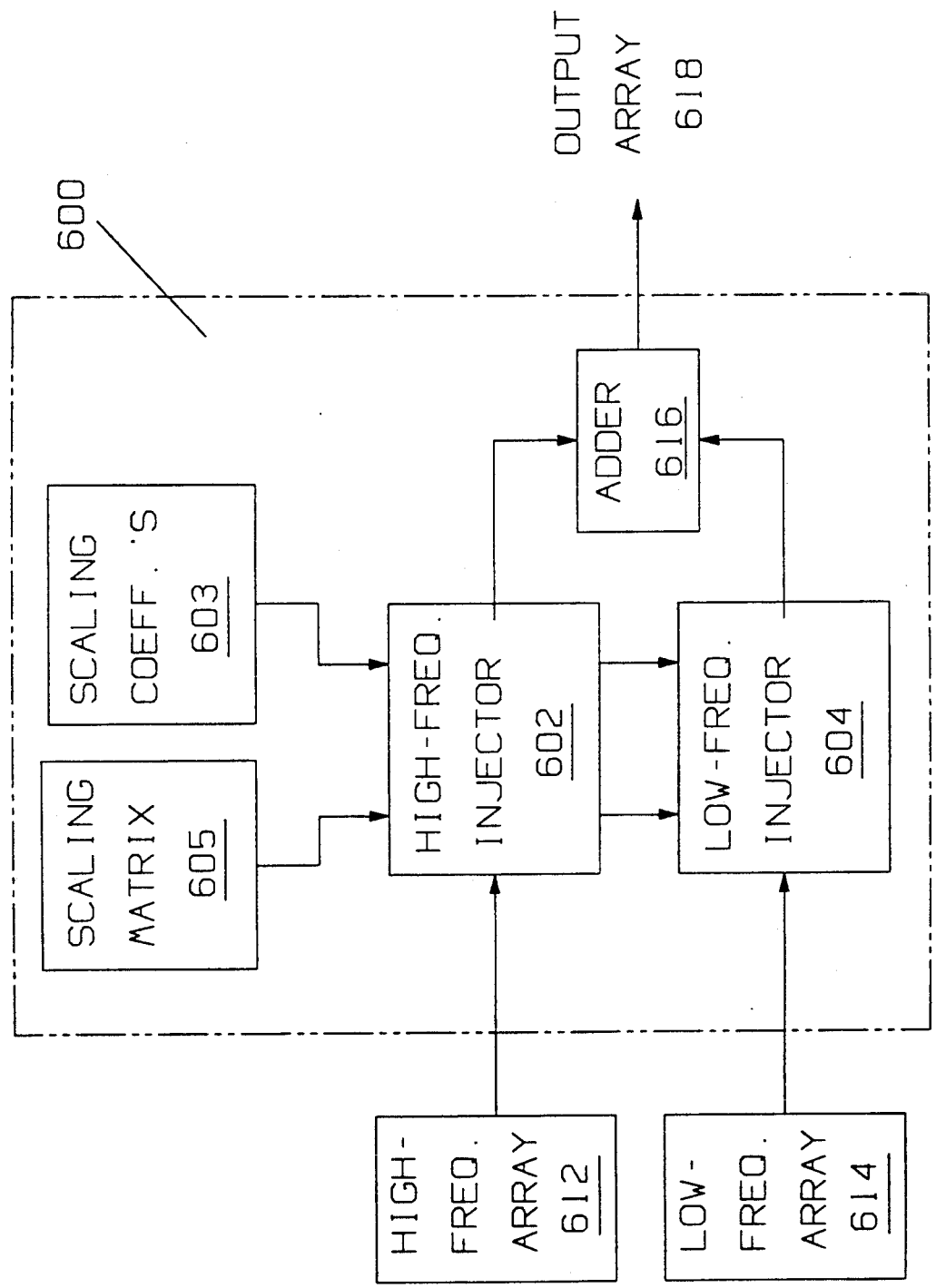
FIG. 6 illustrates a multiplier two synthesizer module according to the present invention.

The two "injectors" can be combined to form an apparatus to synthesize an array from its high-frequency and low-frequency components with respect to a set of scaling coefficients and a scaling matrix. A block diagram of a synthesizer module is illustrated in FIG. 6 at 600. Synthesizer module 600 includes a High-Frequency Injector 602 and a Low-Frequency Injector 604. A set of scaling coefficients is stored in a first memory 603, and a scaling matrix is stored in a second memory 605. These must be the same scaling coefficients and scaling matrix as were used to decompose the original array if the original array is to be recovered. A high-frequency array 612 such as that generated by the High-Frequency Projector sub-system described above is inputted to High-Frequency Injector 602. A low-frequency array 614 such as that generated by the Low-Frequency Projector sub-system described above is inputted to Low-Frequency Injector 604. The arrays outputted by Injectors 602 and 604 are added pairwise by pairwise adder 616 to form the output array 618.

If the low-frequency array has L elements, the output array 618 will have approximately 2L elements. It should be noted that if the high-frequency array is not known, i.e., the high-frequency array was not saved after the decomposition of the original array, then High-Frequency Injector 602 and pairwise adder 616 can be omitted from synthesizer module 600. In this case, the output of Low-Frequency Injector 604 becomes output array 618. This is equivalent to replacing the high-frequency array by an array in which each element is 0.

Figure 7:
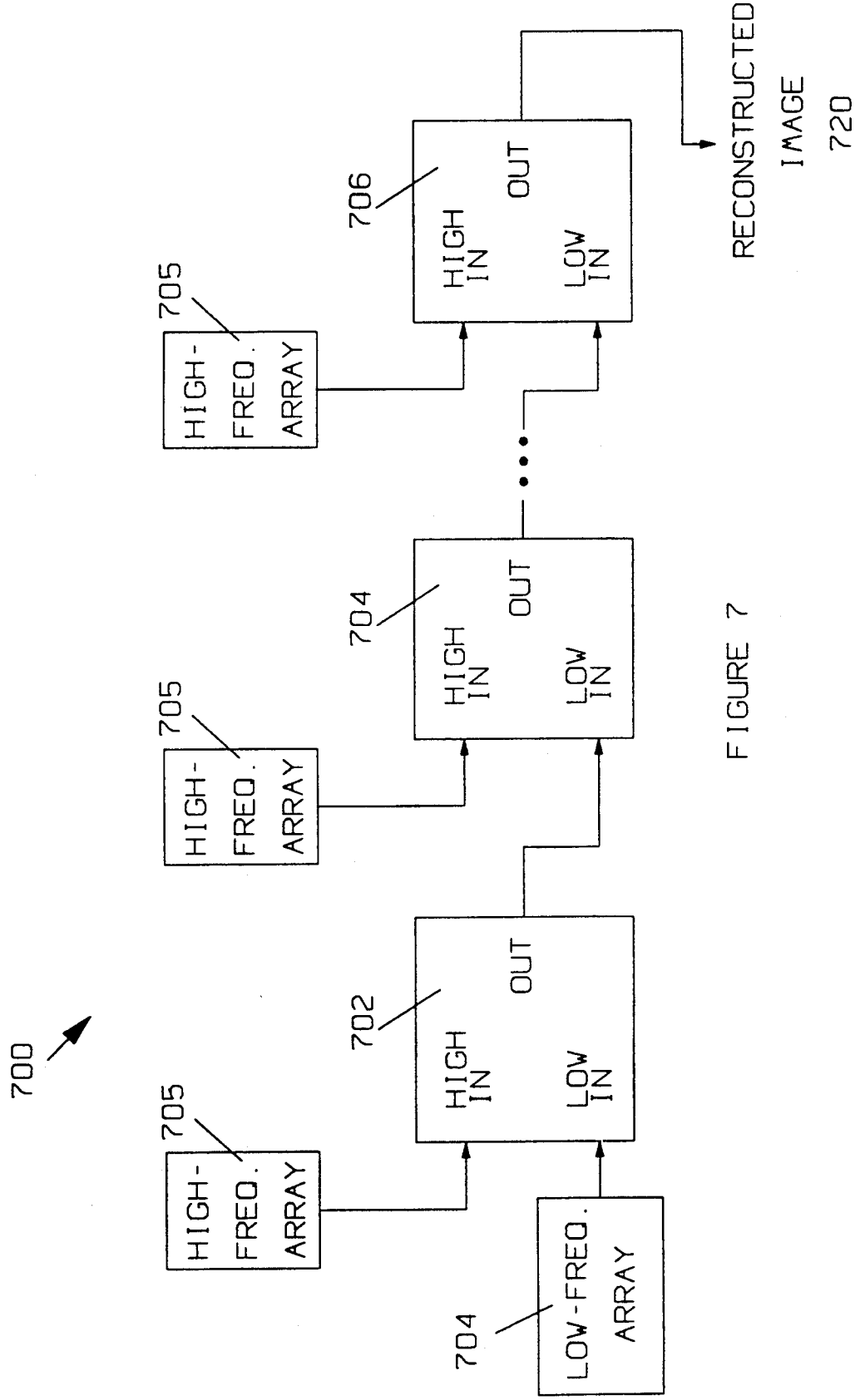
FIG. 7 illustrates an apparatus for synthesizing an image from its low-frequency and high frequency arrays utilizing a plurality of multiplier two synthesizer modules.

A plurality of synthesizer modules may be connected in series to provide an apparatus for regenerating an image from a multi-level decomposition thereof. Such an apparatus is shown in FIG. 7 at 700. Apparatus 700 has an input synthesizer module 702, one or more optional intermediate synthesizer modules 704, and an output synthesizer module 706. Input synthesizer module 702 receives a low-frequency array 704 and a corresponding high-frequency array 705 as its inputs. The reconstructed array generated by each synthesizer module becomes the low-frequency array which is inputted to the next synthesizer module in the series. The corresponding high-frequency array 705 from the decomposition of the original image becomes the high-frequency input array. The final synthesizer module 706 has the reconstructed image 720 as its output. If the high-frequency arrays were not saved in the decomposition operation, arrays having all zeros could be utilized. Alternatively, the simplified synthesizer modules lacking High-Frequency Injectors may be utilized.

The above method depends on selecting a set of scaling coefficients $(a_k)$. The values $(a_k)$ may be considered to be an array, since these values comprise a set of numbers indexed by an ordered pair of values $(k_1, k_2) = k$. Hence, the set of values will be referred to as the scaling coefficient array in the following discussion.

A scaling coefficient array may be obtained from a one-dimensional sequence of scaling coefficients, $b_j$, where j runs from 0 to $N_c - 1$. Here, $N_c$ is the number of coefficients in the one-dimensional sequence. The process involves arranging the $b_j$ in an array which satisfies the conditions of Eqs. (13) and (14). A sequence of numbers is said to be a one-dimensional sequence of multiplier 2 scaling coefficients if it satisfies the following constraints:

$$\Sigma_j b_j = 2 \quad (20)$$

and $$\Sigma_j b_j^* b_{j+2q} = 2\delta_{0,q} \quad (21)$$

Here, j runs from 0 to $N_c - 1$. The simplest such one-dimensional sequence consists of the sequence in which $b_0 = b_1 = 1$. Eq. (20) and (21) are only valid for the case in which M = 2.

There are an infinite number of 2-dimensional deployments of the $b_j$ which satisfy the equations in question. The simplest deployment of the $b_j$ is to set $a_{j,0} = b_j$ and $a_{j,s} = 0$ if $s \neq 0$. This particular deployment of the $b_j$ will be referred to as the x-axis deployment of the $b_j$ into a two-dimensional scaling coefficient array.

The preferred embodiment of the present invention utilizes a $2 \times 2$ integervalued matrix G with determinant equal to $\pm 1$, the x-axis deployment described above, and any of the multiplier 2 scaling matrices described above to generate a matrix of scaling coefficients. Let S be the two dimensional scaling matrix in question. Let $d_k$ denote the x-axis deployment of the $b_j$. That is, $d_{j,0} = b_j$, and all other values of $d_{i,j} = 0$. Here, the individual components of the vector k have been shown explicitly. Define a vector $r = (1,0)$. Then the general twodimensional deployment of the $b_j$ is given by $$a_{Sp} = d_{SGp}$$

and $$a_{Sp+r} = d_{SGp+r} \quad (22)$$

Having described the embodiments of the present invention having multiplier 2, the more general case in which the transformation has multiplier of two or more will now be discussed. In the general case, the multiplier of the transformation, i.e., $|\det S|$, is M, where M can be any integer which is greater than one. The number of possible values of $\sigma$ in Eq. (8) depends on M. It can be shown that $\sigma$ can take on those integer values for which $$|\sigma| \leq 2\sqrt{M} \text{ if det } S > 0 \text{ and}$$

$$2 - M \leq \sigma \leq M - 2 \text{ if det } S < 0 \quad (23)$$

Figure 8:
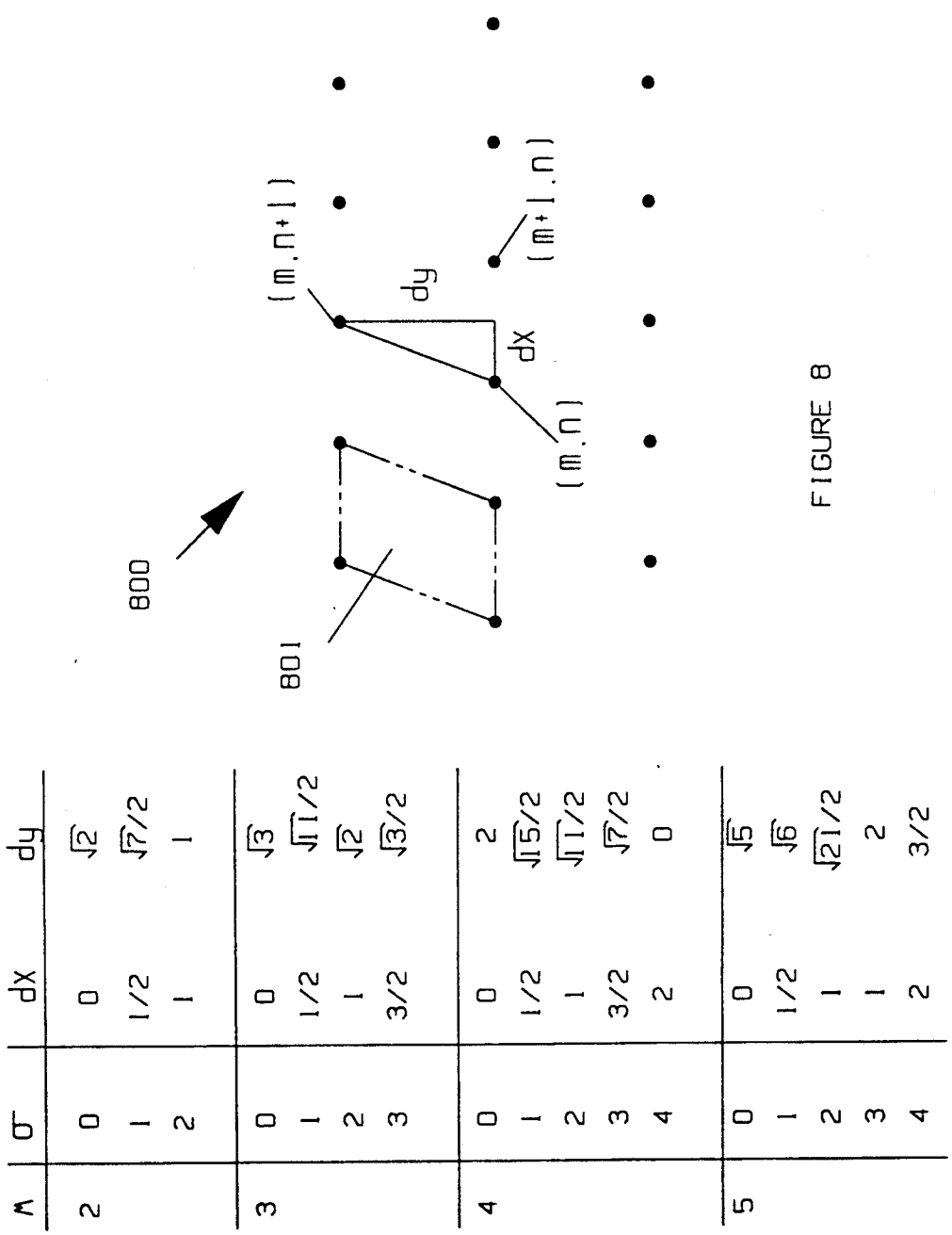
FIG. 8 illustrates a grid as defined by a transformation according to the present invention.

In general, $\sigma$ and M determine a grid on which the implicit theoretical hypothetical detector elements are located. Such a grid is shown in FIG. 8 at 800 together with a table of the permissible $\sigma$ values for M less than 6. The grid is a parallelogram as shown at 801. The grid points are labeled with integer indices. To simplify FIG. 8, the grid has been drawn with x-axis as one of the grid directions. The other grid direction is specified by the values of dx and dy.

As noted above, the grid points and matrix S determine the hypothetical detector elements. For each value of $\sigma$ and M, M such elements can be combined to form a single element which has M times the area and which is rotated by the angle whose arctangent is dy/dx.

Given a matrix S having multiplier M, a sequence of scaling coefficients $\{a_p\}$ is defined in a manner analogous to that described above for the case in which M was 2. The scaling coefficients may be complex numbers. Again, it is advantageous to choose the $\{a_p\}$ such that these values are non-zero for only a small number of the possible p values.

For the transformation to provide a division into low and high-frequency components and also be invertible, the scaling coefficients must satisfy $$\Sigma_p a_p = |\det S| \qquad (24)$$

Here, $a_p$ are summed over all possible integer vectors for which $a_p$ is non-zero.

As noted above, it is advantageous to use a transformation in which the basis functions form an orthonormal set. It can be shown that this requires that $$\Sigma_p a_p^* a_{p+Sq} = M\delta_{O,q} \qquad (25)$$

Here, (*) indicates complex conjugation, and, q is any integer vector.

The set of two-dimensional scaling coefficients $\{a_p\}$ of multiplier M can be generated from a set of one dimensional scaling coefficients of multiplier M using the method described above with reference to Eq. (22). A set of one dimensional scaling coefficients $\{b_j\}$, j running from O to $N_c-1$, has multiplier M if $$\Sigma_j b_j = M \qquad (26)$$

and $$\Sigma_j b_j^* b_{j+Mq} = M\delta_{O,q}0 \qquad (27)$$

where q is any integer, and j runs from O to $N_c-1$.

The $\{a_p\}$ may be used to construct a Low-Frequency Projector analogous to that described above with reference to M=2 case. Given a data array $I_m$, the Low-Frequency Projector generates a Low-Frequency Projection array $V_m$ with respect to the array of scaling coefficients $a_m$ and the scaling matrix S according to the formula $$V_m = (\Sigma_p a_p^* I_{Sm+p})/|\det S| \qquad (28)$$

Here, p runs over all values for which $a_p$ is non-zero. If the array $I_m$ has N elements, the Low-Frequency Projection array will have approximately N/M elements. Eq. (28) is repeated for each possible value of m.

In general, there are (M−1) corresponding High-Frequency Projectors. The $i^{th}$ such projector generates a High—Frequency Projection array with respect to the array of scaling coefficients $a_m$ and the scaling matrix S according to the formula $$^iW_m = (\Sigma_p {}^ia_p^* I_{Sm+p})/|\det S| \qquad (29)$$

Here, p runs over all values for which $^ia_p^*$ is non-zero. If the array $I_m$ has N elements, each of the High-Frequency Projection arrays will have approximately N/M elements. Eq. (29) is repeated for each possible value of m.

For M values greater than two, the sets of wavelet coefficients $\{^ia_p\}$ are only partially determined by the scaling coefficients $\{a_p\}$. In general, the coefficients $\{^ia_k\}$ satisfy the following equations for each value of $i=1,\ldots M-1$ $$\Sigma_p {}^ia_p^* {}^ja_{p+Sq}^* = M\delta_{ij}\delta_{0,q} \qquad (30)$$

Here, the sums are performed over those p values for which $^ia_p$ is different from zero. It can be shown that there must be at least M such values for these conditions to be satisfied. The function $\delta_{r,s}$ is the conventional delta function which is equal to zero unless r=s, in which case it is equal to one. The case in which there are precisely M such values which are non-zero and equal to one corresponds to the simple case in which M adjacent hypothetical detector elements are combined to form the low frequency basis functions. Equation (30) guarantees that the $\{^iW_m\}$ are the coefficients of the high frequency basis functions in an expansion of the form $$\Sigma_p I_p {}^1F_p(x) = \Sigma_p v_p {}^MF_p(x) + \Sigma_{p,i} {}^iW_p {}^MG_{i,p}(X) \qquad (31)$$

Here, the functions $^MG_{i,p}(X)$ are the high frequency basis functions corresponding the coefficients $^ia_p$.

As noted above, it is important to choose an expansion in which the basis functions are an orthonormal set. The basis functions comprise the $^MF_p(X)$ for the various p values on the grid and the $^MG_{i,p}(X)$ for the M−1 values of i and the various p values on the grid. The requirement that the $^MF_p(X)$ be orthogonal to each of the sets $\{^MG_{i,p}(X)\}$ will be satisfied if, for each value $i=1,\ldots M-1$, $$\Sigma_m a_m^* {}^ia_{m+Sp} = 0 \qquad (32)$$

for all values of p. The requirement that the $\{^MG_{j,p}(x)\}$ be orthogonal to each of the sets $\{^MG_{i,p}(x)\}$ will be satisfied if, for all values of i and j between 1 and M−1, $$\Sigma_m {}^ia_m^* {}^ja_{m+Sp} = 0 \qquad (33)$$

for all values of p when $i \neq j$ and for all $p \neq 0$ when $i=j$. For the remaining case, i.e., $i=j$ and $p=0$, the requirement is $$\Sigma_m {}^ia_m^* {}^ia_m = M \qquad (34)$$

In the case in which M=2 the $\{^ja_m\}$ are completely specified up to a constant once the $\{a_m\}$ are specified. However, when M>2, Eqs. (32) and (33) no longer uniquely specify the $\{^ja_m\}$ given the $\{a_m\}$. That is, there are many sets of $\{^ja_m\}$ which satisfy these equations. The manner in which this added freedom in the choice of $\{^ja_m\}$ can be advantageously utilized to chose one of the many possible bases to achieve the most effective quantization will be discussed in more detail below. For the purposes of the present discussion, it will be assumed that one of the sets of $\{^ja_m\}$ satisfying Eqs. (32) and (33) is chosen once the $\{a_m\}$ have been chosen.

The High-Frequency Projectors and the Low-Frequency Projector differ from one another only in the coefficients used in the weighted sum of the input array $I_m$. These projectors are the two-dimensional analog of a class of finite impulse response filters known as conjugate mirror filters. One dimensional conjugate mirror filters with multiplier two are known to the prior art. These devices operate by computing an output signal in which each signal value comprises a weighted sum of the input signal values. The in the prior art systems, the weights are set of one dimensional scaling coefficients having multiplier equal to two. Special purpose hardware for performing the convolution of the input signal with the scaling coefficients are known to the prior art.

The projectors used in the present invention perform a two-dimensional convolution of a two-dimensional "input signal" comprising a data array to generate a two-dimensional output signal which is also preferably a data array. The convolution operation is preferably carried out using digital circuitry. However, analog circuitry for carrying out this operation will be apparent to those skilled in the art.

Figure 4:
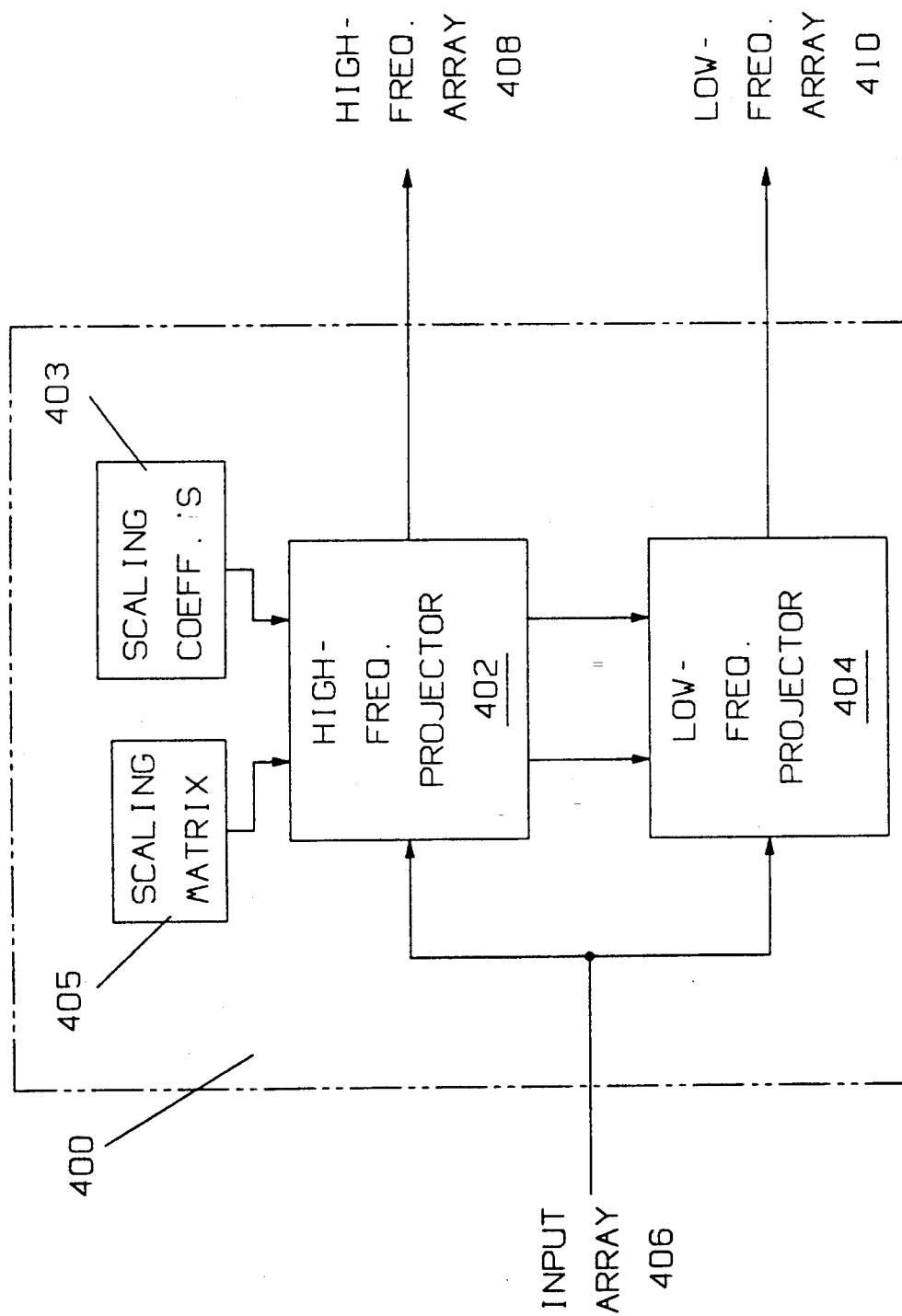
FIG. 4 illustrates an multiplier two analyzer module according to the present invention.
Figure 9:
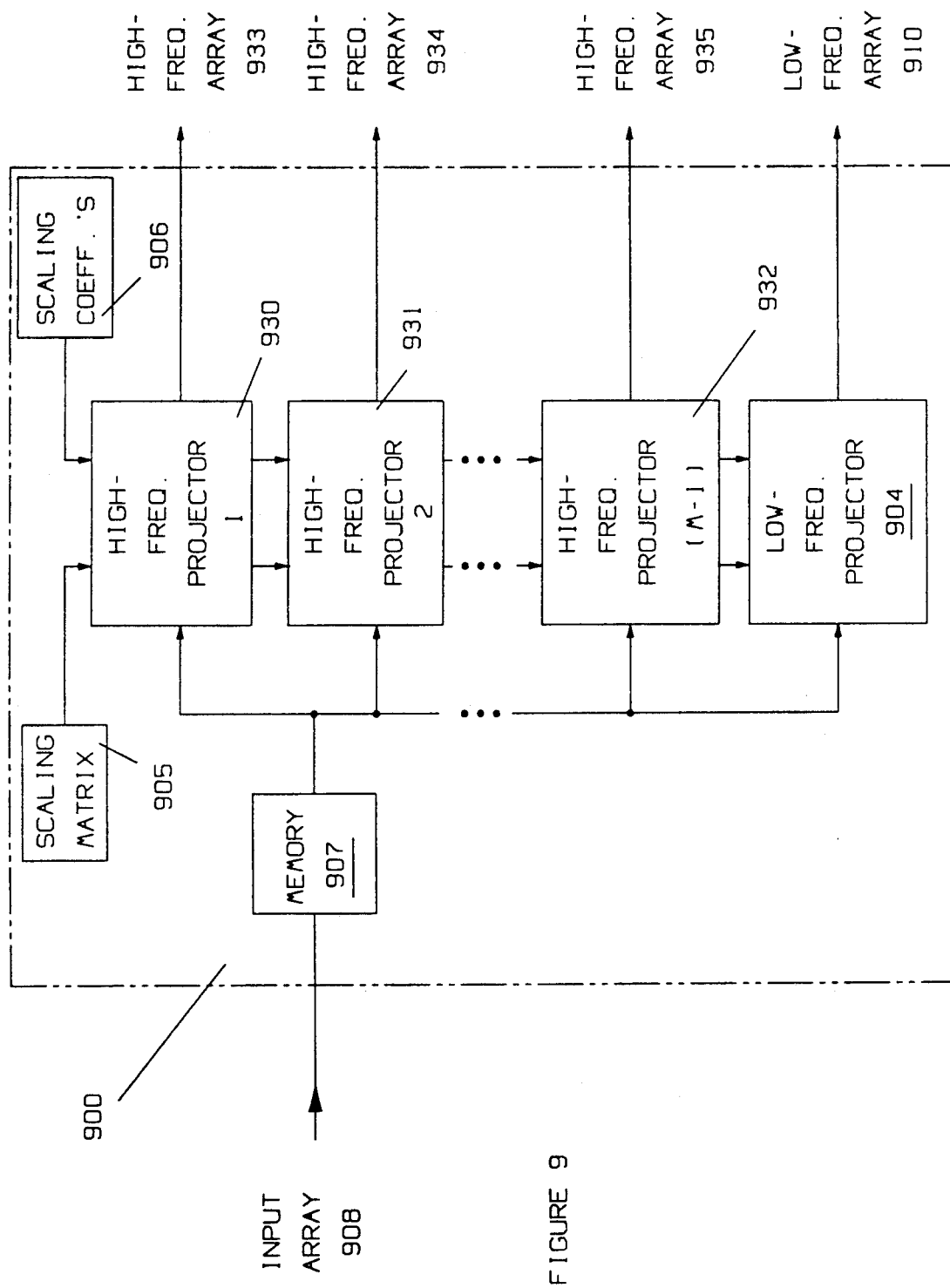
FIG. 9 illustrates another embodiment of an analyzer module according to the present invention.

A Low-Frequency Projector and the (M−1) corresponding High-Frequency Projectors can be combined to form an analyzer sub-system similar to analyzer 400 shown in FIG. 4. Such an analyzer sub-system is shown in FIG. 9 at 900. Analyzer sub-system 900 includes a Low-Frequency Projector 904 and (M−1) High-Frequency Projectors. Exemplary High-Frequency Projectors are shown at 930–932. The Low-Frequency Projector 904 generates a low-frequency array 910. The high-frequency array corresponding to High-Frequency Projectors 930–932 are shown at 933–935, respectively. Each of the projectors is connected to conventional memories 905 and 906 which are used to store the scaling matrix and scaling coefficients, respectively.

Analyzer sub-system 900 preferably includes a memory 907 for storing the input array 908 during the convolution process. However, embodiments in which only a portion of input array 908 is stored will be apparent to those skilled in the art. In particular, if the convolution operation only requires input array elements from a small number of rows of the array, only these rows need be stored.

The various projectors in Analyzer sub-system 900 are preferably controlled from a common clocking system which allows the operation of the projectors to be coordinated to avoid conflicts when the various projectors attempt to access memory 907. Alternatively, a multi-ported memory may be used for memory 907.

One or more of the High-Frequency Projectors may be omitted from analyzer sub-system 900 if the corresponding high-frequency arrays are not to be quantized. Hence, the minimal analyzer sub-system according to the present invention would have only the Low-Frequency Projector 904. More complex analyzers are constructed by adding High-Frequency projectors. The next most complex analyzer would include the Low-Frequency Projector and one High-Frequency Projector, and so on. For notational convenience, the High-Frequency projectors will be numbered in order. That is, the first such projector generates high-frequency array $^1W_m$, the second generates high-frequency array $^2W_m$, and so on.

The present invention provides two basic methods for constructing an image coding scheme with a simple image compression ratio of R. First, a transformation having a multiplier M equal to R can be utilized together with a single analyzer sub-system such as analyzer sub-system 900 described above. As will be apparent to those skilled in the art from the discussion of FIG. 8 above, as M increases, the number of possible transformations with a given M also increases. Hence, this approach allows the user to select from a number of transformations. Typically, one would select the transform which provided the minimum acceptable image quality in the reconstructed image while requiring the minimum number of bits to store the low-frequency array and any of the high-frequency arrays having significant image information.

Figure 10:
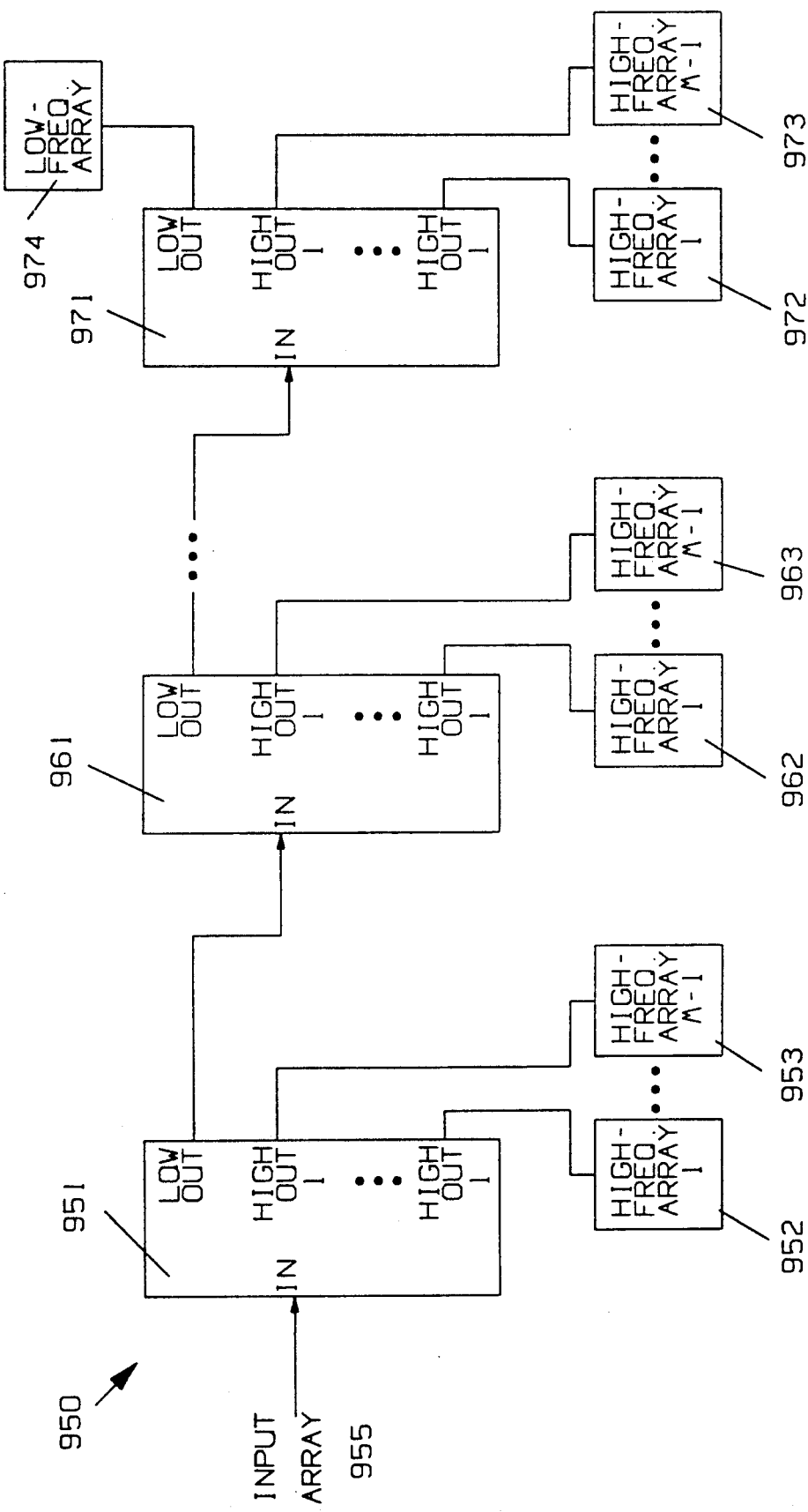
FIG. 10 illustrates an apparatus for decomposing an image into low-frequency and high frequency arrays according to the present invention which utilizes a plurality of analyzer modules of the type shown in FIG. 9.

In the second method, a plurality of analyzer sub-systems having simple compression ratios less than R are combined in a manner which is analogous to that described with reference to apparatus 500 described above. The simple compression ratio of the combined system is equal to the product of the individual simple compression ratios. Such a combined apparatus is shown at 950 in FIG. 10. Apparatus 950 includes a plurality of analyzer sub-systems connected in a series configuration. Typical analyzers are shown at 951, 961, and 971. In general, each analyzer receives an input array and generates therefrom a low-frequency array and (M−1) high-frequency arrays. However, as noted above, the generation of the high-frequency arrays is optional. To simplify FIG. 10, each of the analyzer sub-systems is shown as having the same multiplier, M. However, as will be discussed in more detail below, it is to be understood that each of the analyzer sub-systems may have a different multiplier.

The first analyzer receives an input array 905 and generates therefrom a low-frequency array and high-frequency arrays of which arrays 952 and 953 are typical. The output of the low-frequency array generated by the first analyzer 951 is used as the input to the second analyzer 961. The second analyzer 961 likewise generates a low-frequency array and high-frequency arrays of which arrays 962 and 963 are typical. Each successive analyzer in the chain receives an input comprising the low-frequency array generated by the previous analyzer and generates a low-frequency array and the corresponding high-frequency arrays. The last analyzer 971 in the chain generates the final low-frequency array 974 which comprises the low-frequency output of apparatus 950. Analyzer 971 also generates high-frequency arrays of which arrays 972 and 973 are typical.

As noted above, the individual analyzer sub-systems in apparatus 950 may utilize transformations having different multipliers. The simple image compression ratio of apparatus 950 is the product of the multipliers of the transformations used in the individual analyzer sub-systems. Since any integer can be expressed as a product of prime numbers, any R can be obtained if two-dimensional transformations having multipliers which are the prime numbers are known.

It should be noted that the two methods discussed above generate different representations of the input image even in the cases in which the overall simple compression ratios of the two systems are the same. For example, consider the case in which an image is to be coded with a simple image compression ratio of 6. Such a coding could be accomplished by utilizing a single analyzer sub-system employing a transformation having a multiplier of 6. Such a system would produce a low-frequency array and 5 high-frequency arrays. Each such array would have approximately one sixth the number of elements as the original array.

Alternatively, an apparatus having two analyzer sub-systems connected in series could be employed. The first analyzer sub-system would utilize a transformation having a multiplier of 3, and the second analyzer sub-system would utilize a transformation having a multiplier of 2. This system would also produce a low-frequency array having one-sixth the elements of the original input array. However, the elements of this array would differ from those produced by the first system discussed above.

The high-frequencies arrays will also differ from those produced by the first system. The first analyzer sub-system will generate two high frequency arrays and one low-frequency array. Each array will have one third the number of elements as the original image. The second analyzer sub-system will receive the low-frequency array from the first analyzer sub-system and generate one low frequency array and one high-frequency array. The number of elements in the high-frequency array will be one half the number of elements of the array input to the analyzer sub-system. Hence, this last high-frequency array will have one-sixth the number of elements as the original array.

Hence, this second apparatus produces only three high-frequency arrays. The total number of elements in the high-frequency arrays generated by each of the apparatuses is the same; however, the groupings of the elements and the values of the individual elements differ.

From the preceding discussion, it will be apparent to those skilled in the art that the present invention provides a large number of possible codings for any given array. Each of the codings represents a different division of the information in the array into a high and low frequency components. The choice of a specific coding will, in general, depend on the subsequent processing of the arrays.

For example, consider the case in which the purpose of the coding is to reduce the number of bits needed to store an image such that the stored image can later be reconstructed to a predetermined accuracy. In this case, the input array is the array of pixel values representing the image. For each possible coding, the number of bits needed to quantize the low-frequency array and those high-frequency arrays having significant information is calculated. This number can then be compared against the other possible coding schemes generated by the present invention to determine the scheme which requires the fewest bits for the specific image being coded. To make this determination, the coded image can be reconstructed and compared to the original image.

The reconstruction of an image coded by the more general embodiment of the present invention is carried out in a manner analogous to that described above with reference to embodiments utilizing multiplier two transformations. A synthesizer sub-system can be constructed from a Low-Frequency Injector and (M−1) High-Frequency Injectors. Given a data array $V_m$, the Low-Frequency Injector generates an array $^L I_m$ with respect to the array of scaling coefficients $a_m$ and the scaling matrix S according to the formula $$^L I_m = \Sigma_k a_{m-Sk} V_k \qquad (35)$$

Here, k runs over all values for which $a_{m-Sk}$ is non-zero. If the array $V_m$ has L elements, the array $^L I_m$ will have approximately ML elements, where M is the multiplier of the transformation defined by S and the scaling coefficients. Eq. (35) is repeated for each possible value of m.

Given a data array $w_m$, the High-Frequency Injector generates an array $^{H[i]} I_m$ with respect of the array of wavelet coefficients $^i a_m$ and the scaling matrix S according to the formula $$^{H[i]} I_m = \Sigma_k {}^i a_{m-Sk} W_k \qquad (36)$$

Here, k runs over all values for which $^i a_{m-Sk}$ is non-zero. If the array $W_m$ has L elements, the array $^{H[i]} I_m$ will have approximately ML elements. Eq. (36) is repeated for each possible value of m.

The Injectors all structurally all the same. The Injectors all perform convolution of same type described above with respect to the various Projects. They differ only in the coefficients used in the convolution.

Figure 11:
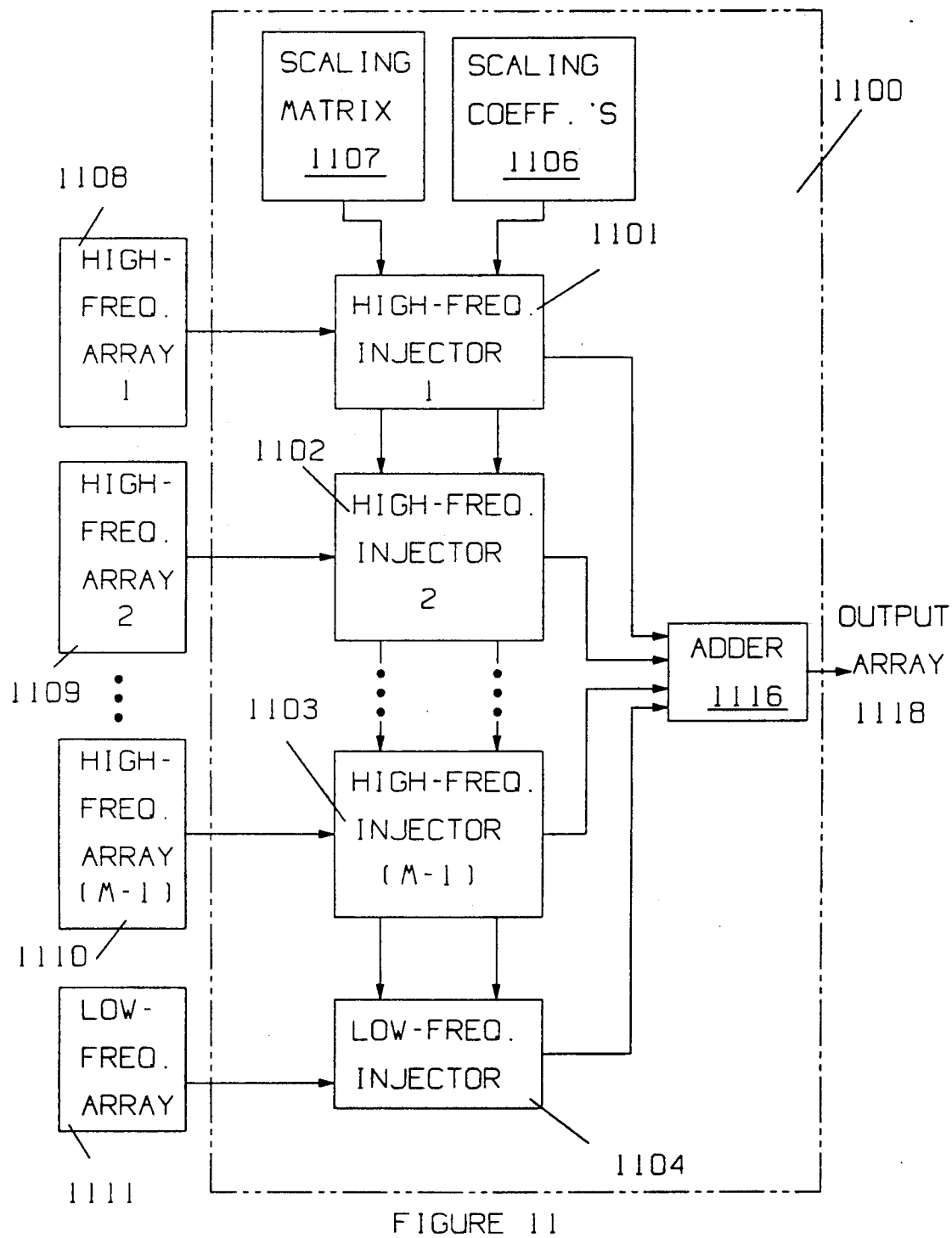
FIG. 11 illustrates another embodiment of a synthesizer module according to the present invention.

A Low Frequency Injector and (M−1) High-Frequency Injectors can be combined to form an apparatus to synthesize an array from its high-frequency and low-frequency arrays with respect to a set of scaling coefficients and a scaling matrix. A block diagram of such a synthesizer module is illustrated in FIG. 11 at 1100. Synthesizer module 1100 includes (M−1) High-Frequency Injectors of which injectors 1101–1103 are typical and a Low-Frequency Injector 1104. A set of scaling coefficients are stored in memory 1106, and a scaling matrix is stored in memory 1107. The scaling coefficients and scaling matrix are inputted to each of the injectors. These must be the same scaling coefficients and scaling matrix as were used to decompose the original array if the original array is to be recovered.

High-frequency arrays are inputted to each of the High-Frequency Injectors. The arrays corresponding to injectors 1101–1103 are shown at 1108–1110, respectively. Each injector preferably includes a memory for storing the corresponding array. A low-frequency array 1111 is inputted to Low-Frequency Injector 1104. The corresponding elements of the arrays outputted by the High-Frequency Injectors and the Low-Frequency Injector 1104 are added by adder 1116 to form the output array 1118.

If the various input arrays each have L elements, the output array 1118 will have approximately ML elements where M is the multiplier of the transformation specified by the scaling matrix and scaling coefficients. It should be noted that if one or more of the high-frequency arrays are not known, i.e., the high-frequency arrays in question were not saved after the decomposition of the original array, these arrays can be replaced by arrays having zeros for each element therein. If all of the high-frequency arrays are to be so replaced, then the High-Frequency Injectors adder 1116 can be omitted from synthesizer module 1100. In this case, the output of Low-Frequency Injector 1104 becomes output array 1118.

The simplest synthesizer apparatus according to the present invention would be one having a scaling matrix S and a set of scaling coefficients $\{a_m\}$. Such an apparatus would be useful in generating a decompressed image from a low frequency image $^L I_m$ using S and $\{a_m\}$. The next most complex synthesizer would be one having a scaling matrix S, a set of scaling coefficients $\{a_m\}$, and one set of wavelet coefficients $\{^1 a_m\}$. This apparatus generates an image based on $^L I_m$ and $^{H[1]} I_m$. Successively more complex projectors can be constructed by the inclusion of additional sets of wavelet coefficients.

Figure 12:
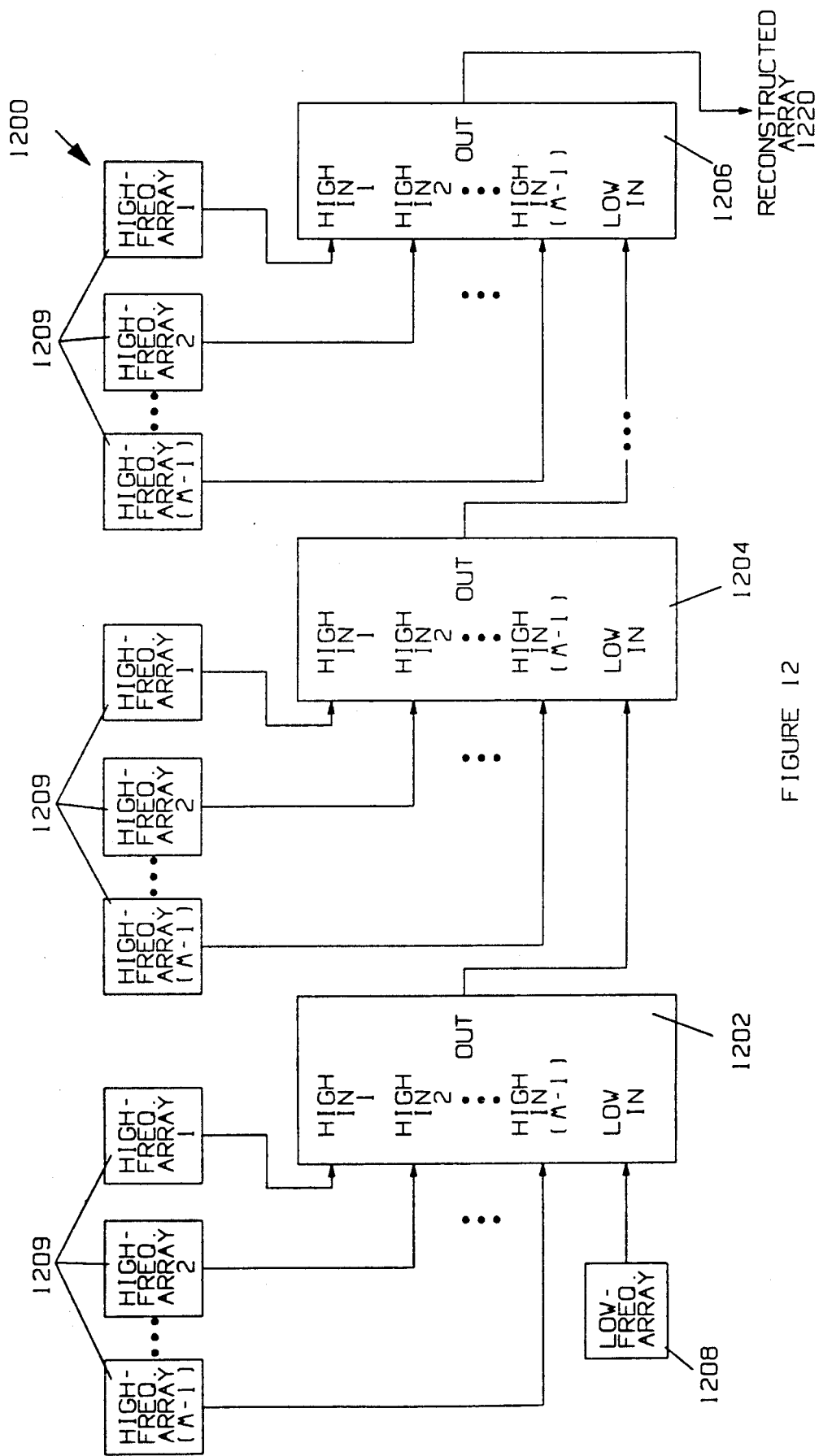
FIG. 12 illustrates an apparatus for synthesizing an image from its low-frequency and high frequency arrays according to the present invention which utilizes a plurality of synthesizer modules of the type shown in FIG. 11.

A plurality of synthesizer modules may be connected in series to provide an apparatus for regenerating an image from a multi-level decomposition thereof. An apparatus 1200 for synthesizing an image from the component images generated by the analyzing apparatus 950 discussed is shown in FIG. 12. Apparatus 1200 has an input synthesizer module 1202, one or more optional intermediate synthesizer modules 1204, and an output synthesizer module 1206. Input synthesizer module 1202 receives a low-frequency array 1208 and corresponding high-frequency arrays 1209 as its inputs.

The reconstructed array generated by each synthesizer module becomes the low-frequency array which is inputted to the next synthesizer module in the series. The corresponding high-frequency arrays 1209 from the decomposition of the original image become the high-frequency input arrays. The final synthesizer module 1206 has the reconstructed image 1220 as its output. If the high-frequency arrays were not saved in the decomposition operation, arrays having all zeros could be utilized. Alternatively, if all of the high-frequency arrays contain zeros, simplified synthesizer modules lacking High-Frequency Injectors may be utilized.

To simplify FIG. 12, each of the synthesizer modules has been shown as utilizing a transformation of multiplier M. However, it should be noted that the multipliers of the transformations used by each of the synthesizer modules may be different. In general, the multipliers of the transformations must be the same as that of the analyzer sub-systems used to generate the high and low-frequency arrays.

Having described the methods and apparatuses for decomposing an array into low and high-frequency arrays and the methods and apparatuses for reversing the decompositions, some additional features of the present invention will now be discussed. For image compression applications, it would be advantageous to select low-frequency basis functions which more closely represent the features found in the image being processed. If this can accomplished, then more of the image information will appear in the low-frequency array. If, on the other hand, the low-frequency basis functions do not represent the features found in the image, then additional information will need to be provided to adequately reconstruct the image. This additional information must appear in the high-frequency arrays. Hence, the degree to which the image may be compressed is reduced if the low-frequency basis functions do not reflect the structures found in the image.

As noted above, one advantageous feature of the present invention lies in the variety of basis of functions provided thereby. Each transformation provides different basis functions. By examining different transformations according to the present invention, the transformation in which the corresponding basis functions most closely represents the image features may be selected. Unfortunately, the number of possible permutations of multipliers, $\sigma$ values, and $\{a_m\}$ is too large to exhaustively search. Hence, it would be advantageous to be able to limit these parameters to those values which are likely to provide superior performance on broad classes of images.

For example, it is known that most images contain structures that have smooth variations within the structure. Hence, basis functions which approximate polynomials in two-dimensions would be expected to more closely represent these structures. Basis functions which have this property may be selected by utilizing the sets of scaling coefficients, $\{a_m\}$, in which the corresponding coefficients $\{{}^i a_m\}$ have low order moments that vanish. For the basis functions to approximate polynomials of degree d, the following condition will be satisfied if the $\{{}^i a_k\}$ must be satisfied $$r_0{}^e r_1{}^f = M^{-1} \Sigma_k \Sigma_p {}^i a_{r-Sk} {}^i a_p{}^*(Sk+p)_0{}^e(Sk+p)_1{}^f \qquad (37)$$

Eq. (37) must be satisfied for all integer valued vectors $r=(r_0, r_1)$, any values of e and f such that $0 \leq e \leq d$ and $0 \leq f \leq d-e$. The summations are carried out for those values of k and p for which ${}^i a_{r-Sk}$ and ${}^i a_p{}^*$ are both non-zero.

The present invention differs from prior art coding schemes such as that taught by Adelson, et al. in the above-mentioned United States Patent in the type of basis functions and the multipliers of the corresponding transformations. In prior art image coding schemes, only transformations having multipliers of 4 and two-dimensional basis functions which could be written as the product of two one-dimensional basis functions are utilized. Such functions are usually referred to as "reducible". Reducible basis functions correspond to sets of two-dimensional scaling coefficients that can be written as a product of the form $$a_{(i,j)} = d_i e_j \qquad (38)$$

where the sequences $\{d_i\}$ and $\{e_j\}$ are sets of one-dimensional scaling functions. In the case taught by Adelson, et al. the multiplier is 2.

Transformations utilizing reducible basis functions have a number of problems. First, only simple compression ratios which are powers of four may be obtained utilizing such transformations. Furthermore, to obtain a simple compression ratio greater than 4, the transformation must be iterated a number of times. Consider the case in which a simple image compression ratio of 16 is desired and in which the high-frequency coefficients are not quantized. Prior art methods require the transformation to be applied twice. In the present invention, a single application of a multiplier 16 transformation may be utilized. The computational workload of applying a single multiplier 16 transformation can be shown to be significantly less than that of applying a multiplier 4 transformation twice.

Second, the variety of basis functions is severely limited in prior art methods. Referring to FIG. 8, the only basis functions available in prior art methods are those corresponding to multiplier 4 and $\sigma$ equal to 4. These basis functions correspond to hypothetical detectors which are square. Such functions most adequately represent image structures with horizontal or vertical edges or edges inclined at an angle of $\pm 45°$ to the horizontal. In contrast, the present invention can provide basis functions which are sensitive to edges at many different angles, not to mention structures which differ substantially from sums of squares. It should be noted that even in the case of multiplier 4, the present invention provides four additional classes of basis functions (corresponding to $\sigma = 0, 1, 2$, and 3) which are not available in prior art methods.

The present invention may be implemented in special purpose hardware to increase the speed of computation. Alternatively, the present invention may utilize conventional digital computers with the appropriate software.

While the present invention has been described in terms of an apparatus and method for compressing an image, it will be apparent to those skilled in the art that the method can provide a useful coding scheme for other purposes. For example, the high frequency coefficients obtained from the present invention may be utilized in pattern recognition systems for detecting edges of various shapes and orientations. In this case, an apparatus having only one or more high frequency projectors and no low frequency projector may be adequate for analyzing the image. The choice of basis functions, i.e., the scaling matrix S, the scaling coefficients, and the wavelet coefficients determine the shape and orientation of the types of edges detected. Here again, the large choice of bases available with the present invention provides a significant advantage over prior art coding schemes.

The present invention has been described in terms of orthonormal sets of scaling coefficients. However, it is to be understood that the invention will still function without this requirement. Hence, the present invention is not limited to transformations involving orthonormal basis functions or sets of scaling coefficients. If the particular application of the present invention does not require orthonormality, then Eqs. (14), (21), (25), (27), (30), (32), and (33) need not be satisfied.

There has been described herein a apparatus and method for coding a two-dimensional data array. Various modifications to the present invention will become apparent to those skilled in the art from the foregoing description and accompanying drawings. Accordingly, the present invention is to be limited solely by the scope of the following claims.

What is claimed is:

1. An apparatus for generating a compressed image from an input image comprising a pixel array, $I_m$, said apparatus comprising projection filtration means for filtering said input image to generate a low-frequency filtered image comprising a pixel array $v_m$; and output means including quantization means for approximating $v_m$ by integer values of a predetermined precision, wherein said low-frequency filtration means comprises:

means for storing a 2×2 matrix S, wherein $|\det S| > 1$ and S maps any lattice point in a 2-dimensional lattice into another point in said lattice;

means for storing a set of irreducible scaling coefficients $\{a_m\}$, said set of scaling coefficients having multiplier $M = |\det S|$;

means for receiving $I_m$;

means for generating $v_m$, wherein $$v_m = \left( \sum_k a_k^* I_{Sm+k} \right) / M.$$

and k runs over all values for which $a_k$ is not zero; and means for outputting $v_m$.

2. The apparatus of claim 1 further comprising high-frequency projection filter means for generating a high-frequency image comprising a pixel array, $^1w_m$ from said input image, said high-frequency projection apparatus comprising:

means for storing a set of coefficients $\{^1a_m\}$, wherein $$\sum_m {}^1a_m = 0,$$

$$\sum_m a_m^* {}^1a_{m+Sk} = 0, \text{ and}$$

$$\sum_m {}^1a_m^* {}^1a_{m+Sk} = M\sigma_{0,k}.$$

and m runs over all values for which $^1a_m$ is non-zero;

means for generating $^1w_m$, wherein $$^1w_m = \left[ \sum_k {}^1a_k^* I_{Sm+k} \right] / M$$

and k runs over those values for which $^1a^*_k$ is non-zero; and means for outputting $^1w_m$.

3. An image reconstruction apparatus for generating a low-frequency image comprising a two-dimensional pixel array $^LI_m$ from a compressed image, said reconstruction apparatus comprising input means for receiving said compressed image, said input means including dequantizing means for generating a two-dimensional filtered image comprising an array $v_m$ from said compressed image; and low-frequency injection filtering means for generating $^LI_m$ from $v_m$, said low-frequency injection filtering means comprising:

means for storing a 2×2 matrix S, wherein $|\det S| > 1$ and S maps any lattice point in a 2-dimensional lattice into another point in said lattice;

means for storing a set of irreducible scaling coefficients $\{a_m\}$, said set of scaling coefficients having multiplier $M = |\det S|$;

means for receiving $v_m$; and means for generating $^LI_m$ according to the formula $$^LI_m = \sum_k a_{m-Sk} V_k$$

and k runs over all values for which $a_{m-Sk}$ is not zero.

4. The image reconstruction apparatus of claim 3 further comprising high-frequency injection filter means for generating constructing a high frequency image comprising a pixel array $^{H(1)}I_m$ from a compressed high-frequency image comprising a high-frequency pixel array $^1w_m$ and for combining said high-frequency image and with said low-frequency image to form a reconstructed image, said high-frequency injection filter means comprising:

means for storing set of coefficients $\{^1a_m\}$, wherein $$\sum_k {}^1a_m = 0,$$

$$\sum_m a^*_{m+Sk} = 0,$$

and $$\sum_m {}^1a^*_m {}^1a_{m+Sk} = M\delta_{0,k}$$

and m runs over all values for which $^1a_m$ is non-zero;

means for receiving a two dimensional array $^1w_m$;

means for generating a second data array, $^{H(1)}I_m$, wherein $$^{H(1)}I_m = \sum_k {}^1a_{m-Sk} W_k$$

and means for adding corresponding elements of $^{H(1)}I_m$ and $^LI_m$ to generate the pixels of said reconstructed image.

5. An image reconstruction filter for generating a reconstructed image comprising a pixel array $^{H(1)}I_m$ from a compressed low frequency image comprising a pixel array $w_m$, said image reconstruction filter comprising:

means for storing a 2×2 matrix S, wherein $M = |\det S| > 1$ and S maps any lattice point in a 2-dimensional lattice into another point in said lattice;

means for storing a set of irreducible coefficients $\{^1a_m\}$, wherein $$\sum_m {}^1a_m = 0,$$

and

-continued $$\sum_m {}^1a_m {}^1a^*_{m+Sk} = M\delta_{0,k}$$

and m runs over all values for which ${}^1a_m$ is non-zero; and means for receiving $w_m$;
means for generating $H^{(1)}I_m$, wherein $$H^{(1)}I_m = \sum_k {}^1a_{m-Sk}w_k/M$$

and k runs over those value for which $a_{m-Sk}$ is non-zero.

6. A method for operating an apparatus to generate a compressed low-frequency image comprising a pixel array $V_m$ from an image represented by a pixel array, $I_m$, said method comprising the steps of:
storing a 2×2 matrix S, wherein $|\det S|>1$ and S maps any lattice point in a 2-dimensional lattice into another point in said lattice;
storing a set of irreducible scaling coefficients $\{a_m\}$, said set of scaling coefficients having a multiplier $M=|\det S|$;
receiving said $I_m$; and
generating $V_m$, wherein $$v_m = \left( \sum_k a_k^* I_{Sm+k} \right)/M.$$

and k runs over all values for which $a_k$ is not zero.

7. The method of claim 6 further comprising the step of:
generating a high-frequency compressed image represented by a pixel array ${}^1w_m$, wherein said high-frequency compressed image generating step comprises the steps of:
storing a set of coefficients $\{{}^1a_m\}$, wherein $$\sum_m {}^1a_m = 0,$$

$$\sum_m {}^1a^*_m {}^1a^*_{m+Sk} = 0, \text{ and}$$

$$\sum_m {}^1a^*_m {}^1a^*_{m+Sk} = M\delta_{0,k}$$

and m runs over all values for which ${}^1a_m$ is non-zero; and
generating ${}^1w_m$, wherein $${}^1w_m = \left( \sum_k {}^1a^*_k I_{Sm+k} \right)/M.$$

and k runs over those values for which ${}^1a^*_k$ is non-zero.

8. A method for operating an apparatus to generate a low-frequency image represented by a pixel array ${}^LI_m$ from a compressed image comprising a pixel array $v_m$, said method comprising the steps of:
storing a 2×2 matrix S, wherein $|\det S|>1$ and S maps any lattice point in a 2-dimensional lattice into another point in said lattice;
storing a set of irreducible scaling coefficients $\{a_m\}$, said set of scaling coefficients having multiplier $M=|\det S|$;
receiving said two-dimensional array, $v_m$; and
generating ${}^LI_m$ according to the formula $${}^LI_m = \sum_k a_{m-Sk}v_k/M$$

and k runs over all values for which $a_k$ is not zero.

9. The method of claim 8 further comprising the steps of: storing set of coefficients $\{{}^1a_m\}$, wherein $$\sum_m {}^1a_m = 0,$$

$$\sum_m a^*_m {}^1a_{m+Sk} = 0,$$

and $$\sum_m {}^1a^*_m {}^1a^*_{m+Sk} = M\delta_{0,k}$$

and m runs over all values for which ${}^1a_m$ is non-zero;
receiving a compressed high-frequency image represented by a pixel array ${}^1w_m$;
generating a second reconstructed high-frequency image represented by a pixel array $H^{(1)}I_m$, wherein $$H^{(1)}I_m = \sum_k {}^1a_{m-Sk} {}^1w_k/M$$

and
adding corresponding elements of ${}^LI_m$ and $H^{(1)}I_m$ to generate a pixel array representing a reconstructed image having both high and low spatial frequencies.

10. An apparatus for generating a low-frequency filtered image comprising a pixel array $v_m$ and at least one high-frequency filtered image comprising a pixel array $w_m$ from an image comprising a pixel array $I_m$, said apparatus comprising:
video memory means for storing at least a portion of $I_m$;
means for receiving the pixels of $I_m$, said receiving means causing said received pixels to be stored in said video memory means;
matrix memory means for storing a 2×2 matrix S, wherein $|\det S|>1$ and S maps any lattice point in a 2-dimensional lattice into another point in said lattice;
coefficient memory means for storing a set of irreducible scaling coefficients $\{a_m\}$, said set of scaling coefficients having multiplier $M=|\det S|$ and a set of coefficients $\{{}^1a_m\}$, wherein $$\sum_m {}^1a_m = 0,$$

$$\sum_m a^*_m {}^1a_{m+Sk} = 0,$$

and $$\sum_m {}^1a^*{}_m {}^1a^*{}_{m+Sk} = M\delta_{0,k}$$

and m runs over all values for which ${}^1a_m$ is non-zero;
means for receiving $I_m$;
means for generating $v_m$, wherein
low-frequency filter means for generating said low-frequency filtered image, wherein $$v_m = \left(\sum_k a_k^* I_{Sm+k}\right)/M,$$

and k runs over all values for which $a_k$ is not zero, said low-frequency filter means being connected to said video memory means;
high-frequency filter means for generating said high-frequency filtered image, wherein $$w_m = \left[\sum_k {}^1a_k^* I_{Sm+k}\right]/M,$$

and k runs over those values for which ${}^1a^*_k$ is non-zero, said high-frequency filter means being connected to said video memory means;
control means, connected to said low-frequency filter means and said high-frequency filter means, for coordinating said low-frequency filter means and said high-frequency filter means so as to avoid conflicts in accessesing said video memory.

11. An apparatus for reconstructing an image from a low-frequency filtered image comprising a pixel array $v_m$ and at least one high-frequency filtered image comprising a pixel array $w_m$, said reconstructed image comprising a pixel array $I_m$, said apparatus comprising:
video memory means for storing at least a portion of $v_m$ and $w_m$;
means for receiving the pixels of $v_m$ and $w_m$, said receiving means causing said received pixels to be stored in said video memory means;
matrix memory means for storing a 2×2 matrix S, wherein $|\det S| > 1$ and S maps any lattice point in a 2-dimensional lattice into another point in said lattice;
coefficient memory means for storing a set of irreducible scaling coefficients $\{a_m\}$, said set of scaling coefficients having multiplier $M = |\det S|$ and a set of coefficients $\{{}^1a_m\}$, wherein $$\sum_m {}^1a_m = 0,$$

$$\sum_m a^*_m {}^1a_{m+Sk} = 0,$$

and $$\sum_m {}^1a^*_m {}^1a^*_{m+Sk} = M\delta_{0,k}$$

and m runs over all values for which ${}^1a_m$ is non-zero;
means for receiving $I_m$;
first reconstruction means for generating a low-frequency reconstructed image comprising a pixel array ${}^L I_m$ from said low-frequency filtered image, said first reconstruction means being connected to said video memory means, wherein $${}^L I_m = \sum_k a_{m-Sk} v_k / M$$

and k runs over all values for which $a_k$ is not zero;
second reconstruction means for generating a high-frequency reconstructed image comprising a pixel array ${}^{H(1)} I_m$ from said high-frequency filtered image, said second reconstructed means being connected to said video memory means, wherein $${}^{H(1)} I_m = \sum_k {}^1a_{m-Sk} {}^1w_k / M$$

and k runs over all values for which $a_k$ is not zero;
means for adding corresponding elements of ${}^L I_m$ and ${}^{H(1)} I_m$ to generate $I_m$; and
control means, connected to said first and second reconstruction means for coordinating said low-frequency filter means and said high-frequency filter means so as to avoid conflicts in accessesing said video memory.

* * * * *

UNITED STATES PATENT AND TRADEMARK OFFICE
CERTIFICATE OF CORRECTION

PATENT NO. : 5,101,446

DATED : March 31, 1992

INVENTOR(S) : Resnikoff, et al.

It is certified that error appears in the above-identified patent and that said Letters Patent is hereby corrected as shown below:

Column 2, line 8, delete "8-bits" and insert therefor --8 bits--.

Column 2, line 28, delete "universe" and insert therefor --inverse--.

Column 3, line 40, delete "limit" and insert therefor --limited--.

Column 4, line 47, after "which" insert --is--.

Column 7, line 67, delete "an multiplier two" and insert therefor --a multiplier 2 --.

Column 8, line 4, delete "two" and insert therefor --2 --.

Column 8, line 8, delete "two" and insert therefor --2 --.

Column 9, line 39, delete "of" and insert therefor --between --.

Column 10, line 52, after "ratios" insert --of --.

Column 11, line 24, delete "were" and insert therefor --is --.

Column 13, line 17, delete "appears" and insert therefor --appear --.

Column 15, line 49, after "of" insert --the--.

Column 16, line 23, after "formula" insert the attached application page 27.

Column 16, line 38, after "that" insert --if --.

Column 16, line 57, delete "of" and insert therefor --to --.

Column 19, line 46, delete "High_Frequency" and insert therefor --High-Frequency --.

Column 19, line 62, delete $\sum_p {}^i a_p^* {}^j a_p + S_q^* = M\delta_{i,j}\delta_{0,q}$ and insert therefor --$\sum_p {}^i a^*_p {}^j a^*_p + S_q = M\delta_{i,j}\delta_{0,q}$--.

Column 20, line 55, delete "two" and insert therefor --2 --.

UNITED STATES PATENT AND TRADEMARK OFFICE
CERTIFICATE OF CORRECTION

PATENT NO. : 5,101,446
DATED : March 31, 1992
INVENTOR(S) : Resnikoff, et al.

It is certified that error appears in the above-identified patent and that said Letters Patent is hereby corrected as shown below:

Column 20, line 58, delete "The in the" and insert therefor --In the --.

Column 20, line 60, delete "two." and insert therefor --2.--.

Column 21, line 38, delete "projectors." and insert therefor --Projectors.--.

Column 21, line 42, delete "projectors" and insert therefor --Projectors --.

Column 22, line 13, delete "905" and insert therefor --955 --.

Column 22, line 48, delete "one sixth" and insert therefor --one-sixth --.

Column 22, line 63, delete "one third" and insert therefor --one-third --.

Column 22, line 64, delete "as" and insert therefor --of --.

Column 23, line 1, delete "one half" and insert therefor --one-half --.

Column 23, line 15, delete "a" after "into".

Column 23, line 27, delete "against" and insert therefor --with --.

Column 23, line 36, delete "two" and insert therefor --2 --.

Column 23, line 62, delete "The Injectors all structurally all" and insert therefor --The injectors are structurally all --.

Column 23, line 62, delete second occurrence of "Injectors" and insert therefor --injectors --.

Column 23, line 62, delete "convolution of same" and insert therefor --a convolution of the same --.

UNITED STATES PATENT AND TRADEMARK OFFICE
CERTIFICATE OF CORRECTION

PATENT NO. : 5,101,446

DATED : March 31, 1992

INVENTOR(S) : Resnikoff, *et al.*

Page 3 of 4

It is certified that error appears in the above-identified patent and that said Letters Patent is hereby corrected as shown below:

Column 23, line 64, delete "Projects." and insert therefor --projectors.--.

Column 24, line 34, after "Injectors" insert --and --.

Column 24, line 54, after "discussed" insert --above --.

Column 26, line 13, delete "four" and insert therefor --4 --.

Column 26, lines 55 and 56, delete "high frequency projectors and no low frequency projector" and insert therefor --High-Frequency Projectors and no Low-Frequency Projector --.

Column 29, line 3, delete first occurence of "a" and insert therefor --a*--.

Column 29, line 14, delete "value" and insert therefor --values--.

Column 29, line 61, delete $^l a^*_k$ and insert therefor --$^l a_k$--.

Column 31, line 28, delete $^l a^*_k$ and insert therefor --$^l a_k$--.

Column 31, line 35, delete "accessesing" and insert therefor --accessing--.

Column 5, line 33, delete "allocated" and insert therefor --allocate--.

Column 6, line 21, after "function" delete "is".

UNITED STATES PATENT AND TRADEMARK OFFICE
CERTIFICATE OF CORRECTION

PATENT NO. : 5,101,446
DATED : March 31, 1992
INVENTOR(S) : Resnikoff, et al.

It is certified that error appears in the above-identified patent and that said Letters Patent is hereby corrected as shown below:

Column 15, line 40, after "this" delete "is".

Column 23, line 53, delete "of" and insert therefor --to--.

Column 27, line 5, delete "a" and insert therefor --an--.

Signed and Sealed this

Twenty-fifth Day of January, 1994

BRUCE LEHMAN

*Attest:*

*Attesting Officer*  *Commissioner of Patents and Trademarks*